US009527266B2

(12) United States Patent
Matsuo et al.

(10) Patent No.: US 9,527,266 B2
(45) Date of Patent: Dec. 27, 2016

(54) MULTI-LAYER LAMINATED FILM

(71) Applicant: Toray Industries, Inc., Tokyo (JP)

(72) Inventors: Yuji Matsuo, Otsu (JP); Takayuki Uto, Otsu (JP); Syunichi Osada, Otsu (JP); Wataru Goda, Otsu (JP)

(73) Assignee: Toray Industries, Inc. (JP)

( * ) Notice: Subject to any disclaimer, the term of this patent is extended or adjusted under 35 U.S.C. 154(b) by 113 days.

(21) Appl. No.: 14/385,235

(22) PCT Filed: Mar. 13, 2013

(86) PCT No.: PCT/JP2013/056922
§ 371 (c)(1),
(2) Date: Sep. 15, 2014

(87) PCT Pub. No.: WO2013/137288
PCT Pub. Date: Sep. 19, 2013

(65) Prior Publication Data
US 2015/0064428 A1    Mar. 5, 2015

(30) Foreign Application Priority Data

Mar. 16, 2012 (JP) .................. 2012-059723
Oct. 9, 2012 (JP) .................. 2012-223826

(51) Int. Cl.
*B32B 27/36* (2006.01)
*B32B 17/10* (2006.01)
*B32B 7/02* (2006.01)
*G02B 1/04* (2006.01)
*G02B 5/28* (2006.01)
*B32B 27/08* (2006.01)

(52) U.S. Cl.
CPC ............. *B32B 27/36* (2013.01); *B32B 7/02* (2013.01); *B32B 17/10779* (2013.01); *B32B 27/08* (2013.01); *G02B 1/04* (2013.01); *G02B 5/282* (2013.01); B32B 2250/05 (2013.01); B32B 2250/244 (2013.01); B32B 2250/42 (2013.01); B32B 2274/00 (2013.01); B32B 2307/308 (2013.01); B32B 2307/412 (2013.01); B32B 2307/416 (2013.01); B32B 2307/42 (2013.01); B32B 2307/50 (2013.01); B32B 2307/704 (2013.01); B32B 2307/734 (2013.01); B32B 2307/738 (2013.01); B32B 2551/00 (2013.01); B32B 2605/08 (2013.01); Y10T 428/24942 (2015.01); Y10T 428/31786 (2015.04)

(58) Field of Classification Search
CPC ............ B32B 27/36; B32B 27/08; B32B 7/02; B32B 17/10779; G02B 5/28; G02B 5/208; G02B 5/282
See application file for complete search history.

(56) References Cited

U.S. PATENT DOCUMENTS

| | | | | |
|---|---|---|---|---|
| 5,360,659 A | * | 11/1994 | Arends | B32B 17/10018 359/359 |
| 6,049,419 A | * | 4/2000 | Wheatley | B32B 17/10018 359/359 |
| 2006/0084780 A1 | | 4/2006 | Hebrink et al. | |
| 2008/0050579 A1 | * | 2/2008 | Kirkman | B32B 17/10 428/323 |
| 2010/0178524 A1 | * | 7/2010 | Yoshimura | B32B 27/36 428/480 |
| 2012/0207993 A1 | * | 8/2012 | Joo | B32B 27/08 428/216 |

FOREIGN PATENT DOCUMENTS

| | | | |
|---|---|---|---|
| EP | 1 741 550 | 1/2007 | |
| EP | 2 724 856 | 4/2014 | |
| JP | 10-076620 A | 3/1998 | |
| JP | 2003-511729 A | 3/2003 | |
| JP | 3901911 B2 | 1/2007 | |
| JP | 2007-268709 A | 10/2007 | |
| JP | 2007-307893 A | 11/2007 | |
| JP | 2008-200924 | 9/2008 | |
| JP | 4310312 B2 | 8/2009 | |
| JP | 2010-017854 A | 1/2010 | |
| JP | 4534637 B2 | 6/2010 | |
| JP | 4691910 B2 | 3/2011 | |
| JP | 2011-141408 A | 7/2011 | |
| JP | 2011-156687 A | 8/2011 | |
| JP | 4816419 B2 | 9/2011 | |
| JP | 2012-030563 A | 2/2012 | |
| KR | WO 2011043623 A2 | * 4/2011 | B32B 7/02 |
| WO | 99/36258 | 7/1999 | |
| WO | 2012/008587 A1 | 1/2012 | |

OTHER PUBLICATIONS

Corresponding Supplementary European Search Report dated Mar. 13, 2015 of European Application No. 13761598.5.

* cited by examiner

Primary Examiner — Prashant J Khatri
(74) Attorney, Agent, or Firm — DLA Piper LLP (US)

(57) ABSTRACT

A multi-layer laminated film includes layers composed using a thermoplastic resin A and layers composed using a thermoplastic resin B, which A layers and B layers are alternately laminated in 51 or more layers, wherein the film has: a heat shrinkage stress of 0.5 MPa to 5 MPa at 150° C. in the longitudinal and width directions of the film; and a heat shrinkage stress kick-off temperature of 110° C. or lower in at least one of the longitudinal and width directions of the film.

13 Claims, No Drawings

MULTI-LAYER LAMINATED FILM

TECHNICAL FIELD

This disclosure relates to a multi-layer laminated film which solves the problem of defects in the outer appearance of a molded article; and a molded article thereof.

BACKGROUND

There are many applications where the exterior of a product is required to have design properties. Such products include cellular phones, housings of personal computers, electrical appliances, furniture and automobiles. There is also an increasing demand for design properties. For the purpose of imparting design properties, methods of pasting a colored film or transferring a printed film surface onto a substrate are known. In addition, multi-layer laminated films that comprise two kinds of resins alternately laminated in the thickness direction and show coloration and reflection of light by utilizing the interference reflection phenomenon exhibited by the resins have been recently made known as a means of imparting design properties. For example, multi-layer laminated films that utilize interference reflection to show metallic luster (Japanese Translated PCT Patent Application Laid-open No. 2003-511729 and Japanese Patent Application Laid-Open Publication (JP-A) No. 2007-268709), a multi-layer laminated film having a near-infrared reflecting function (Japanese Patent No. 4534637) and a multi-layer laminated film having a scattering preventive function (Japanese Patent Application Laid-Open Publication (JP-A) No. H10-076620) are known. Those molded articles produced by hot-press lamination of these multi-layer laminated films on a hard support and subsequent molding of the resulting laminates are used as decorative materials such as decoration panels as well as in various household electric appliances, building articles, automobile-related parts and the like.

In recent years, in response to the introduction of carbon dioxide emission controls for environmental protection, heat ray-shielding glasses capable of suppressing the inflow of heat from outside, particularly sunlight, during summertime have been drawing attention as window glasses of vehicles such as cars and trains and those of buildings.

Examples of such heat ray-shielding glasses include those in which a heat ray-absorbing material incorporated into a glass or an interlayer constituting a laminated glass is used to reflect heat rays (for example, Japanese Patent Application Laid-Open Publication (JP-A) No. 2010-17854); those in which a metal coating layer formed on a glass surface by sputtering or the like is used to reflect and block heat rays (for example, Japanese Patent No. 3901911); and those in which a polymer multi-layer laminated film produced by alternately laminating polymers having different refractive indices is inserted between glasses and interlayers and used to reflect and block heat rays (for example, Japanese Patent No. 4310312). Thereamong, however, in a method of using a heat ray-absorbing material, since the heat ray-absorbing material converts sunlight entering from outside into thermal energy, there is a problem that the thus generated heat radiates into the room and the heat ray-shielding efficiency is consequently reduced. In addition, absorption of heat rays partially increases the glass temperature and the resulting difference between the glass temperature and the ambient temperature may damage the glass itself. Moreover, in a method of forming a metal coating layer on a glass surface by sputtering or the like, since the metal coating layer reflects not only heat rays but also visible light, it is likely to cause coloration. Furthermore, since the metal coating layer blocks electromagnetic waves as well, it may impede the use of communication devices and the like inside.

Meanwhile, in a polymer multi-layer laminated film, the wavelengths to be reflected can be selected by controlling the layer thickness. Therefore, the film can be made to selectively reflect light in the near-infrared range so that the heat ray-shielding performance of a glass can be improved while maintaining the visible light transmittance. In addition, since such a polymer multi-layer laminated film does not contain any radio wave-blocking material such as metal, it can retain excellent radio wave permeability.

Molded articles of those multi-layer laminated films are used in places exposed to the public eye. Therefore, the outer appearance is important. Yet, since such molded articles experience, for example, delamination of printing resistant layer or damage caused by scratching with a sharp object, there is an increasing demand for durability and resistance against damage. The same demand has been made also in the above-described example of pasting a film. However, as a problem unique to films, there is a problem that, for example, irregular pressing due to irregularities in thickness of an interlayer laminated with a support and a difference between the heat shrinkage stress between the film and interlayer cause irregular strains to be generated in the film during molding and this consequently deteriorates the outer appearance. Particularly, in multi-layer laminated films, it has been pointed out that such irregularities are likely to stand out as an optical defect since multi-layer laminated films utilize the interference reflection phenomenon provided by controlling the layer thicknesses. When a support(s), an interlayer(s) and a multi-layer laminated film are laminated and molded, as other problem, generation of wrinkles is also problematic. This primarily occurs in the edge portions of the resulting molded article due to, for example, the inability of the multi-layer laminated film to conform to the shape of the support during the molding or the difference in the heat shrinkage rate between the film and the interlayer. Meanwhile, generation of irregular strains, which is a problem, is different from generation of wrinkles in that it occurs over the entire surface of the resulting molded article regardless of the shape of the support and that it is attributed to irregular pressing caused by thickness variation of the interlayer or a difference between the heat shrinkage stress between the interlayer.

It could therefore be helpful to provide a multi-layer laminated film which inhibits the generation of irregular strains caused by hot-press molding in a molded article comprising the multi-layer laminated film, and an interlayer and a support that are arranged on at least one side of the multi-layer laminated film; and to thereby obtaining a molded article having excellent outer appearance and design.

SUMMARY

We thus provide:
(1) A multi-layer laminated film comprising layers composed using a thermoplastic resin A (A layers) and layers composed using a thermoplastic resin B (B layers), which A layers and B layers are alternately laminated in 51 or more layers, wherein the film has: a heat shrinkage stress of not less than 0.5 MPa and not more than 5 MPa at 150° C. in the longitudinal and width directions of the film; and a heat shrinkage stress kick-off temperature of 110° C. or lower in at least one of the longitudinal and width directions of the film, the heat shrinkage stress kick-off temperature being defined as, in a heat shrinkage stress curve determined under a condition where the temperature ranges from 25° C. to 200° C. and the heating rate is 5° C./min, the temperature at the intersection between the baseline preceding the initial rise of the heat shrinkage stress curve and a tangent line drawn at a point where the heat shrinkage stress curve has the maximum slope after the initial rise;

(2) The multi-layer laminated film according to (1), wherein the film has an average reflectance of 15% or less at a wavelength of 400 to 700 nm;

(3) The multi-layer laminated film according to (1) or (2), wherein the film has a heat shrinkage stress of not less than 0.5 MPa and not more than 5 MPa at 130° C. in both the longitudinal and width directions;

(4) The multi-layer laminated film according to any one of (1) to (3), wherein the heat shrinkage stress kick-off temperature is 110° C. or lower in both the longitudinal and width directions;

(5) The multi-layer laminated film according to any one of (1) to (4), wherein the film has a heat shrinkage stress of not less than 0.5 MPa and not more than 5 MPa at 110° C. in at least one of the longitudinal and width directions;

(6) The multi-layer laminated film according to any one of (1) to (5), wherein the difference in the heat shrinkage stress at 100° C. between the longitudinal and width directions is 0.05 N/mm$^2$ or less;

(7) The multi-layer laminated film according to any one of (1) to (6), wherein the difference in the dimensional change rate at 100° C. between the longitudinal direction of the film and the direction perpendicular thereto is 0.5% or less;

(8) The multi-layer laminated film according to any one of (1) to (7), wherein at least one of the thermoplastic resins A and B is a crystalline polyester; and at least one of the thermoplastic resins A and B is a non-crystalline polyester resin or a polyester resin having a melting point that is lower than that of the crystalline polyester resin by 30° C. or more;

(9) The multi-layer laminated film according to any one of (1) to (8), wherein the thermoplastic resin A is composed of a polyethylene terephthalate resin layer; and the thermoplastic resin B is composed of a copolymerized polyethylene terephthalate resin in which a spiroglycol component(s) and a cyclohexane dicarboxylic acid component(s) are copolymerized;

(10) The multi-layer laminated film according to any one of (1) to (9), wherein the film has an average reflectance of 15% or less in a wavelength range of 400 nm to 700 nm and 70% or higher in a wavelength range of 850 nm to 1,200 nm;

(11) The multi-layer laminated film according to (10), wherein the film has an average reflectance of 40% or higher in a wavelength range of 1,200 nm to 1,400 nm;

(12) The multi-layer laminated film according to any one of (1) to (11), wherein the film has a heat shrinkage rate of 6% or less at 150° C. in the longitudinal and width directions;

(13) A molded article, comprising the multi-layer laminated film according to any one of (1) to (12) and a support laminated via an interlayer on at least one side of the multi-layer laminated film;

(14) A heat-shielding article, comprising: the multi-layer laminated film according to any one of (1) to (12); interlayers each of which is arranged on each side of the multi-layer laminated film; and transparent substrates each of which is arranged on the surface opposite to the multi-layer laminated film on each of the two interlayers; and

(15) A heat-shielding article, comprising: a multi-layer laminated film; interlayers each of which is arranged on each side of the multi-layer laminated film; and transparent substrates each of which is arranged on the surface opposite to the multi-layer laminated film on each of the two interlayers, wherein
the multi-layer laminated film comprises layers composed using a thermoplastic resin A (A layers) and layers composed using a thermoplastic resin B (B layers), which A layers and B layers are alternately laminated in 51 or more layers; the laminated film has an average reflectance of 15% or less at a wavelength of 400 to 700 nm and 60% or higher at a wavelength of 900 to 1,200 nm; and the difference in the heat shrinkage stress at 100° C. between the longitudinal direction of the film and the direction perpendicular thereto is 0.05 N/mm$^2$ or less.

A molded article having excellent outer appearance and design can thus be obtained.

DETAILED DESCRIPTION

We discovered that, in a molded article obtained by hot-press molding a support, an interlayer and a multi-layer laminated film, by allowing the multi-layer laminated film to have a heat shrinkage stress of not less than 0.5 MPa and not more than 5 MPa at 150° C. in the longitudinal and width directions and a heat shrinkage stress kick-off temperature of 110° C. or lower in at least one of the longitudinal and width directions, a molded article having excellent outer appearance can be obtained. This will now be described in detail.

When laminating and molding a support(s), an interlayer(s) and a multi-layer laminated film, heat and pressure are applied thereto to improve the adhesion. During such molding, due to the thickness variation of the interlayer and difference in the heat shrinkage stress between the interlayer and the multi-layer laminated film, irregular strains are generated in the multi-layer laminated film and these strains cause scattering and diffuse reflection of light, which leads to poor outer appearance of the resulting molded article. Since the support is hardly deformed, the shape of the interlayer is not compromised by the support. In a multi-layer laminated film, since there exist interfaces that are formed by different kinds of resins, scattering and reflection of light by the interfaces also occur in addition to the scattering and diffuse reflection of light by the film surface so that irregularities are likely to be more conspicuous on a multi-layer laminated film than on a film composed of a single type of resin. Accordingly, if it were possible to use a multi-layer laminated film on which irregularities are not likely to be generated, the problem of defective outer appearance in the resulting molded article would be solved. A defective outer appearance occurring in a molded article obtained by hot-press molding of a support, an interlayer and a multi-layer laminated film is attributed to irregular strains of the multi-layer laminated film and our film was made as a result of searching for an answer to the question of how such irregularities could be resolved. Our films will now be described in detail. However, this disclosure should not be interpreted restrictively to the following specific examples thereof. It is needless to say that our films also encompass a variety of other examples that are within the scope of the appended claims and does not depart from the spirit of this disclosure.

In the multi-layer laminated film, it is required that layers composed using a thermoplastic resin A (A layers) and layers composed using a thermoplastic resin B that has properties different from those of the resin constituting the A layers (B layers) be alternately laminated in 51 or more layers; that the heat shrinkage stress be not less than 0.5 MPa and not more than 5 MPa at 150° C. in the longitudinal and width directions; and that the heat shrinkage stress kick-off temperature be 110° C. or lower in at least one of the longitudinal and width directions.

Examples of thermoplastic resins that can be used in the multi-layer laminated film include polyolefins such as polyethylene, polypropylene and poly(4-methylpentene-1); cycloolefins such as alicyclic polyolefins that are obtained by ring-opening metathesis polymerization or addition polymerization of norbornene or by addition-copolymerization with other olefins; biodegradable polymers such as polylactic acid and polybutyl succinate; polyamides such as nylon 6, nylon 11, nylon 12 and nylon 66; aramids; polyesters such as polymethyl methacrylate, polyvinyl chloride, polyvinylidene chloride, polyvinyl alcohol, polyvinyl butyral, ethylene-vinyl acetate copolymer, polyacetal, polyglycolic acid, polystyrene, styrene-copolymerized polymethyl methacrylate, polycarbonate, polypropylene terephthalate, polyethylene terephthalate, polybutylene terephthalate and polyethylene-2,6-naphthalate; polyether sulfones; polyether ether ketones; modified polyphenylene ethers; polyphenylene sulfides; polyetherimides; polyimides; polyallylates; tetrafluoroethylene resins; trifluoroethylene resins; trifluorochloroethylene resins; tetrafluoroethylene-hexafluoropropylene copolymers; and polyvinylidene fluorides. Thereamong, from the standpoints of strength, heat resistance and transparency, it is particularly preferred to use a polyester. As the polyester, one which is produced from an aromatic or aliphatic dicarboxylic acid and a diol or derivative thereof is preferred. Examples of the aromatic dicarboxylic acid include terephthalic acid, isophthalic acid, phthalic acid, 1,4-naphthalene dicarboxylic acid, 1,5-naphthalene dicarboxylic acid, 2,6-naphthalene dicarboxylic acid, 4,4'-diphenyl dicarboxylic acid, 4,4'-diphenylether dicarboxylic acid and 4,4'-diphenylsulfone dicarboxylic acid. Examples of the aliphatic dicarboxylic acid include adipic acid, suberic acid, sebacic acid, dimer acid, dodecanedioic acid, cyclohexanedicarboxylic acid, and ester derivatives thereof. Among these dicarboxylic acids, for example, terephthalic acid and 2,6-naphthalene dicarboxylic acid are preferred. These acid components may be used individually, or two or more thereof may be used in combination. Furthermore, these acid components may also be partially copolymerized with an oxy acid such as hydroxybenzoic acid.

Further, examples of the diol component include ethylene glycol, 1,2-propanediol, 1,3-propanediol, neopentyl glycol, 1,3-butanediol, 1,4-butanediol, 1,5-pentanediol, 1,6-hexanediol, 1,2-cyclohexane dimethanol, 1,3-cyclohexane dimethanol, 1,4-cyclohexane dimethanol, diethylene glycol, triethylene glycol, polyalkylene glycol, 2,2-bis(4-hydroxyethoxyphenyl)propane, isosorbate and spiroglycol. Thereamong, ethylene glycol is preferably used. These diol components may be used individually, or two or more thereof may be used in combination.

Among the above-described polyesters, it is preferred to use a polyester selected from polyethylene terephthalate and copolymers thereof polyethylene naphthalate and copolymers thereof polybutylene terephthalate and copolymers thereof polybutylene naphthalate and copolymers thereof polyhexamethylene terephthalate and copolymers thereof and polyhexamethylene naphthalate and copolymers thereof.

In the multi-layer laminated film used in the molded article, at least two kinds of thermoplastic resins, that is, thermoplastic resins A and B, are used and these two thermoplastic resins have different properties. The term "properties" used herein refers to crystallinity/non-crystallinity, optical properties, thermal properties and physical properties. By laminating thermoplastic resins having different properties, the resulting film can be imparted with a function(s) that may not be attained in a single-layer film of each thermoplastic resin. From the standpoint of easily achieving interlayer adhesion and highly precise laminated structure, it is preferred that the above-described two thermoplastic resins comprise the same repeating unit. The term "repeating unit" used herein refers to, for example, an ethylene terephthalate unit in the case of polyethylene terephthalate and an ethylene unit in the case of polyethylene.

As for a preferred combination of the thermoplastic resins to be used in the multi-layer laminated film that have different optical properties, it is primarily preferred that the absolute value of the difference between the SP values (hereinafter, may also be referred to as "solubility parameter") of the respective thermoplastic resins be 1.0 or smaller. When the absolute value of the difference in the SP value is 1.0 or smaller, interlayer delamination is not likely to occur. It is more preferred that the polymers having different optical properties be a combination of polymers that have the same basic skeleton. The term "basic skeleton" used herein refers to a repeating unit constituting a resin. For example, when polyethylene terephthalate is used as one of the thermoplastic resins, from the standpoint of easily achieving a highly precise laminated structure, it is preferred that the thermoplastic resin comprise ethylene terephthalate having the same basic skeleton as that of polyethylene terephthalate. When the thermoplastic resins having different optical properties have the same basic skeleton, a high lamination accuracy is attained and interlayer delamination at the laminate interface is not likely to occur.

To allow the thermoplastic resins to contain the same repeating unit and have different properties, it is desired that they be copolymerized. That is, for example, when one of the resins is polyethylene terephthalate, such an example where a resin constituted by an ethylene terephthalate unit and other ester bond-containing repeating unit is used as the other resin is desirable. From the standpoint of the need for attaining different properties, the ratio of other repeating unit to be incorporated (hereinafter, may also be referred to as "copolymerization amount") is preferably 5 mol % or higher. Meanwhile, the ratio is preferably 90% or lower since this allows the layers to have interlayer adhesion and a small difference in the heat flow characteristics and a laminated film having excellent accuracy and uniformity in the thicknesses of the layers can be thereby obtained. The ratio is still more preferably 10 mol % or higher and 80 mol % or lower. Further, it is also desired that plural kinds of thermoplastic resins be blended or alloyed in each of the A and B layers. By blending or alloying plural kinds of thermoplastic resins, performance that cannot be obtained by a single kind of thermoplastic resin can be attained.

Further, in a preferred combination of the thermoplastic resins to be used in the multi-layer laminated film that have different optical properties, the absolute value of the difference between the glass transition temperatures of the respective thermoplastic resins be 20° C. or less. When the absolute value of the difference in the glass transition temperatures is larger than 20° C., the thickness uniformity is poor when the multi-layer laminated film is formed and this causes variations in the heat-ray shielding performance. In addition, when the multi-layer laminated film is molded, problems such as overstretching is likely to occur.

In a layer constitution where the thermoplastic resins A and B are alternately laminated with the thermoplastic resin A being arranged as the outermost layers, when the absolute value of the difference between the glass transition temperature of the thermoplastic resin A and that of the thermoplastic resin B is larger than 5° C., it is preferred that the glass transition temperature of the thermoplastic resin A be higher than that of the thermoplastic resin B. When the glass transition temperature of an outermost layer is low, the laminated film adheres to rolls and clips during longitudinal stretching or transverse stretching and this may deteriorate the quality of the outer appearance.

As one example of the combination of resins for satisfying the above-described conditions, in the multi-layer laminated film, it is preferred that at least one thermoplastic resin comprise polyethylene terephthalate or polyethylene naphthalate and at least one other thermoplastic resin be a polyester comprising spiroglycol. The term "polyester comprising spiroglycol" used herein refers to a copolyester or homopolyester copolymerized with spiroglycol, or a polyester blended with such copolyester and/or homopolyester. A polyester comprising spiroglycol is preferred because, since the difference between the glass transition temperature thereof and that of polyethylene terephthalate or polyethylene naphthalate is small, the resulting multi-layer laminated film is not likely to be overstretched when molded and interlayer delamination is not likely to occur. It is more preferred that at least one thermoplastic resin comprise polyethylene terephthalate or polyethylene naphthalate and at least one other thermoplastic resin be a polyester comprising spiroglycol and cyclohexanedicarboxylic acid. When a polyester comprising spiroglycol and cyclohexanedicarboxylic acid is used, since the difference between its in-plane refractive index and that of polyethylene terephthalate or polyethylene naphthalate becomes large, the resulting multi-layer laminated film is likely to attain a high reflectance. Furthermore, since the difference between the glass transition temperature of a polyester comprising spiroglycol and cyclohexanedicarboxylic acid and that of polyethylene terephthalate or polyethylene naphthalate is small and such a polyester also has excellent adhesiveness, overstretching of the resulting multi-layer laminated film is not likely to occur during molding and interlayer delamination is also not likely to occur.

In a layer constitution where the thermoplastic resins A and B are alternately laminated with the thermoplastic resin A being arranged as the outermost layers, it is preferred that the thermoplastic resin A comprise polyethylene terephthalate or polyethylene naphthalate and the thermoplastic resin B be a polyester comprising spiroglycol or a polyester comprising spiroglycol and cyclohexanedicarboxylic acid.

As for the copolymerization amount of a polyester comprising spiroglycol and cyclohexanedicarboxylic acid, it is preferred that the copolymerization amount of spiroglycol be 5 mol % to 30 mol % and that of cyclohexanedicarboxylic acid be also 5 mol % to 30 mol %.

Further, at least one thermoplastic resin may be one which contains only polyethylene terephthalate or polyethylene naphthalate or one which is copolymerized with a small amount of other repeating unit or blended with a small amount of other polyester resin, and it is preferred that at least one thermoplastic resin be a polyester comprising cyclohexane dimethanol. The term "polyester comprising cyclohexane dimethanol" used herein refers to a copolyester or homopolyester copolymerized with cyclohexane dimethanol, or a polyester blended with such copolyester and/or homopolyester. A polyester comprising cyclohexane dimethanol is preferred because, since the difference between the glass transition temperature thereof and that of polyethylene terephthalate or polyethylene naphthalate is small, the resulting multi-layer laminated film is not likely to be overstretched when molded and interlayer delamination is not likely to occur. It is more preferred that at least one thermoplastic resin be an ethylene terephthalate polycondensate in which the amount of copolymerized cyclohexane dimethanol is not less than 15 mol % and not more than 60 mol %. By this, while high reflection performance is maintained, the changes in the optical properties caused particularly by heat and time are reduced and interlayer delamination is made unlikely to occur. An ethylene terephthalate polycondensate in which the amount of copolymerized cyclohexane dimethanol is not less than 15 mol % and not more than 60 mol % adheres very strongly with polyethylene terephthalate. Further, its cyclohexane dimethanol group assumes a cis or trans configuration as a geometrical isomer and it also has a chair or boat form as a conformational isomer. Therefore, oriented crystallization is not likely to occur even when it is co-stretched with polyethylene terephthalate. In addition, not only a high reflectance is attained and changes in the optical properties caused by thermal history are further reduced, but also breakage during film formation is made unlikely to occur.

In a layer constitution where the thermoplastic resins A and B are alternately laminated with the thermoplastic resin A being arranged as the outermost layer(s), it is preferred that the thermoplastic resin A comprise polyethylene terephthalate or polyethylene naphthalate and the thermoplastic resin B be a polyester comprising cyclohexane dimethanol.

Further, it is also preferred that at least one of the thermoplastic resins having different optical properties be a crystalline polyester and at least one of the thermoplastic resins be a non-crystalline polyester. The term "crystalline" means that the amount of melting heat determined by differential scanning calorimetry (DSC) is not less than 20 J/g, while the term "non-crystalline" means that the amount of melting heat is 5 J/g or less. By using such a combination of resins, stretching can be easily carried out in the film production and a difference in the refractive index can be easily set in the heat treatment step. In addition, since a non-crystalline polyester has a glass transition temperature that is much higher than that of a crystalline polyester and the orientation thereof can be relaxed by performing a heat treatment at a temperature not higher than the melting point of the crystalline polyester, the difference in the heat shrinkage stress at 100° C. between the film longitudinal direction and the direction perpendicular thereto can be easily reduced and the heat shrinkage stresses at 100° C. in the film longitudinal direction and the direction perpendicular thereto can be easily controlled at 0.05 N/mm$^2$ or less. Still further, it is also preferred that at least one of the thermoplastic resins having different optical properties be a crystalline polyester and at least one of the thermoplastic resins be a polyester resin having a melting point that is lower than that of the above-described crystalline polyester resin by 30° C. or more. In this case, by performing a heat treatment at a temperature that is lower than the melting point of the crystalline polyester showing a higher melting point and higher than the melting point of the crystalline polyester showing a lower melting point, not only the crystalline polyester showing a lower melting point can be fused to relax the orientation, but also the difference in the heat shrinkage stress at 100° C. between the film longitudinal direction and the direction perpendicular thereto can be easily reduced and the heat shrinkage stresses at 100° C. in the film longitudinal direction and the direction perpendicular thereto can be easily controlled at 0.05 N/mm$^2$ or less.

In a layer constitution where the thermoplastic resins A and B are alternately laminated with the thermoplastic resin A being arranged as the outermost layers, it is preferred that the thermoplastic resin A be a crystalline polyester and the thermoplastic resin B be a non-crystalline polyester.

It is also preferred to mix the resin constituting the A layer with a small amount of the resin constituting the B layer and/or to mix the resin constituting the B layer with a small amount of the resin constituting the A layer. By mixing either or both of the A and B layers with the respective resins in this manner, a high lamination accuracy, an improved interlayer adhesion and an effect of improving the stretching properties in the film formation can be attained. The mixing ratio is preferably in the range of 5 wt % to 30 wt %. The term "layers composed using a thermoplastic resin A (A layers)" refers to layers that comprise the thermoplastic resin A not as a small-amount component but as a major component, and the term "layers composed using a thermoplastic resin B (B layers)" refers to layers that comprise the thermoplastic resin B not as a small-amount component but as a major component.

It is preferred that the average reflectance be 15% or less in the wavelength range of 400 to 700 nm. When the average reflectance is high in the wavelength range of 400 nm to 700 nm which is the visible wavelength range, irregularities generated by molding are likely to be conspicuous. The reflectance spectrum of the multi-layer laminated film shifts in accordance with the incident angle of light. Therefore, when the average reflectance in the wavelength range of 400 nm to 700 nm is higher than 15%, viewing irregularities generated by molding from an angle, different colors can be seen depending on the part of the irregularities, and this causes a problem that irregularities that cannot be seen on a single-layer film are observed on the multi-layer film. When the multi-layer laminated film shows reflection in the wavelength range of 400 to 700 nm, since the reflected light or transmitted light is colored, the multi-layer laminated film cannot be adapted to such applications where high transparency is required, particularly automotive applications. Thus, by controlling the average reflectance in the wavelength range of 400 to 700 nm to be 15% or less, the coloration of reflected light and transmitted light that is associated with reflection of visible light can be inhibited and a film that is suitable for applications where high transparency is required can be obtained. The average reflectance in the wavelength range of 400 to 700 nm is preferably 10% or less, more preferably 8% or less. The lower the average reflectance in the wavelength range of 400 to 700 nm, the higher becomes the transparency of the film. As for a method of controlling the average reflectance in the wavelength range of 400 to 700 nm to be 15% or less, such an average reflectance can be attained by adjusting the layer thickness distribution such that a reflection wavelength represented by the below-described Formula (2) stays outside the wavelength range of 400 to 700 nm; by highly accurately laminating the layers such to satisfy the below-described Formula (3) or 711711 constitution so that high-order reflection such as second-order or third-order reflection does not occur at the reflection wavelength; or by performing an AR (anti-reflection) treatment on the surface of the resulting multi-layer laminated film.

In the same manner as described above, in the heat-shielding article as well, it is required that the average reflectance be 20% or less in the wavelength range of 400 to 700 nm. It is preferred that this condition be satisfied by both surfaces of the heat-shielding article comprising transparent substrates (e.g., glass), interlayers and a film. When one of the surfaces does not satisfy this condition, it may cause coloration of transmitted light. The average reflectance in the wavelength range of 400 to 700 nm is preferably 15% or less, more preferably 10% or less. The lower the average reflectance in the wavelength range of 400 to 700 nm, the higher the transparency and the less conspicuous irregularities can be attained by the heat-shielding article.

It is required that the heat shrinkage stress be not less than 0.5 MPa and not more than 5 MPa at 150° C. in the longitudinal and width directions. The lower limit value thereof is more preferably not less than 1 MPa, still more preferably not less than 1.5 MP. The upper limit value is more preferably not greater than 3 MPa. When the heat shrinkage stress is not less than 0.5 MPa, irregular pressing caused by thickness variation of the interlayers as well as irregular strains of the multi-layer laminated film caused by the difference in the heat shrinkage stress between the interlayers and the multi-layer laminated film can be inhibited. When the heat shrinkage stress is higher than 5 MPa, the difference in the heat shrinkage stress between the interlayers and the multi-layer laminated film becomes excessively large so that generation of irregular strains in the multi-layer laminated film cannot be inhibited. Further, the ratio of the heat shrinkage stress in the longitudinal direction and that in the width direction is preferably in the range of not less than 0.5 to not higher than 2. When the balance between the heat shrinkage stress in the longitudinal direction and that in the width direction is poor, wrinkles may be generated. However, when the balance is good, a molded article having no wrinkle can be obtained.

It is required that the heat shrinkage stress kick-off temperature be 110° C. or lower in at least one of the longitudinal and width directions of the film. The "heat shrinkage stress kick-off temperature" is defined as, in a heat shrinkage stress curve of the multi-layer laminated film determined under a condition where the temperature ranges from 25° C. to 200° C. and the heating rate is 5° C./min, the temperature at the intersection between the baseline preceding the initial rise of the heat shrinkage stress curve and a tangent line drawn at a point where the heat shrinkage stress curve has the maximum slope after the initial rise. By allowing generation of heat shrinkage stress in the multi-layer laminated film to start at a low temperature in molding, generation of irregular strains can be inhibited. The heat shrinkage stress kick-off temperature is preferably 100° C. or lower, more preferably 90° C. or lower. It is noted here that, from the standpoint of the problem in the ease of handling, the lower limit value thereof is preferably 50° C., more preferably 70° C.

To allow the multi-layer laminated film to have the above-described characteristics of heat shrinkage stress and heat shrinkage stress kick-off temperature, it is required that the multi-layer laminated film be subjected to the biaxial stretching step and the heat treatment step. Examples of a biaxial stretching method include known simultaneous biaxial stretching methods and sequential biaxial stretching methods. As an example, when polyethylene terephthalate is used for the A layer, polyethylene terephtalate copolymerized with 33 mol % of a cyclohexane dimethanol component is used for the B layer and the resulting film is subjected to sequential biaxial stretching and a heat treatment will now be described. First, the film is stretched using a longitudinal stretching machine at a temperature of 80° C. to 120° C., preferably 80° C. to 100° C. from the standpoint of thickness variation, and a draw ratio of 2 to 6, preferably 3 to 4. Then, using a transverse stretching machine, the film is further stretched at a temperature of 80° C. to 130° C., preferably 90° C. to 120° C., and a draw ratio of 2 to 6, preferably 3 to 4. Lastly, using a heat treatment apparatus, the resulting film is heat-treated at a temperature of 160° C. to 220° C. and a relaxation ratio of 0% to 10%, preferably 0% to 5%. Further, immediately after the heat treatment, it is also preferred to subject the thus heat-treated film to cooling at a temperature that is 70° C. or higher and lower than the heat treatment temperature by 20° C. or more. By this cooling step, the thickness variation of the film can be reduced. It is also effective to control the film temperature to be 80° C. or lower at the outlet of the transverse stretching apparatus where the film is released from the clips. When the film temperature is higher than 80° C., a large shrinking force is applied to the film when the film released from the clips and this may lead to an increased heat shrinkage stress kick-off temperature. In the above-described steps, a higher heat shrinkage stress and a lower heat shrinkage stress kick-off temperature can be attained with lower stretching temperatures, higher drawing ratios and lower relaxation ratio.

By lowering the heat treatment temperature, the heat shrinkage stress can be increased and the heat shrinkage stress kick-off temperature can be lowered. However, for example, when it is desired that the heat shrinkage stress be further increased and the heat shrinkage stress kick-off temperature be further lowered, when it is desired that the crystallization degree of the A layers be increased, or when it is desired that the difference in the refractive index between the A layers and the B layers be increased, it is preferred to perform the heat treatment step and then slight stretching of 2% to 10%. In particular, a superior effect can be attained by performing the slight stretching at a low temperature. By performing the slight stretching of 2% or more, the heat shrinkage stress can be increased and the heat shrinkage stress kick-off temperature can be lowered while maintaining a high heat treatment temperature. Meanwhile, from the standpoint of the problem in the film-forming stability, it is preferred that the ratio of the slight stretching be 10% or less.

It is preferred that the heat shrinkage stress at 130° C. in the longitudinal and width directions be not less than 0.5 MPa and not more than 5 MPa. The lower limit value is more preferably not less than 1 MPa, still more preferably not less than 1.5 MPa, and the upper limit value is more preferably not more than 3 MPa. By controlling the heat shrinkage stress to be high at lower temperatures, generation of irregular strains can be further inhibited. Moreover, the ratio of the heat shrinkage stress in the longitudinal direction and that in the width direction is preferably in the range of not less than 0.5 to not higher than 2. When the balance between the heat shrinkage stress in the longitudinal direction and that in the width direction is poor, wrinkles may be generated; however, when the balance is good, a molded article having no wrinkle can be obtained. As a method of attaining the heat shrinkage stress in this range, for example, the heat treatment temperature can be further lowered or the ratio of the slight stretching performed after the heat treatment step can be further increased.

It is preferred that the heat shrinkage stress kick-off temperature be 110° C. or lower in both the longitudinal and width directions. By controlling the heat shrinkage stress kick-off temperature to be 110° C. or lower in both the longitudinal and width directions, generation of irregular strains can be further inhibited. The heat shrinkage stress kick-off temperature is more preferably 100° C. or lower, still more preferably 90° C. or lower. It is noted here that, from the standpoint of the problem in the ease of handling, the lower limit value thereof is preferably 50° C., more preferably 70° C. As a method of attaining the heat shrinkage stress kick-off temperature in the above-described range, for example, the heat treatment temperature can be further lowered or the ratio of the slight stretching performed after the heat treatment step can be further increased. It is particularly preferred to perform the slight stretching at an increased draw ratio.

It is preferred that the heat shrinkage stress be not less than 0.5 MPa and not more than 5 MPa at 110° C. in at least one of the longitudinal and width directions. The lower limit value thereof is more preferably not less than 1 MPa, still more preferably not less than 1.5 MP. The upper limit value is more preferably not greater than 3 MPa. By controlling the heat shrinkage stress to be high at lower temperatures, generation of irregular strains can be further inhibited.

It is preferred that the difference in the heat shrinkage stress at 100° C. between the longitudinal direction of the film and the direction perpendicular thereto be 0.05 N/mm$^2$ or less. The term "heat shrinkage stress" used herein refers to a value obtained by a thermomechanical analysis and this value is determined by measuring the stress generated in a laminated film sample of 4 mm in width and about 15 mm in measurement length when the laminated film sample is immobilized under a load of 2 g at a certain distance and the temperature is increased from room temperature to 150° C. at a rate of 10° C./minute. Further, the term "method of measuring the heat shrinkage stress" used herein refers to a method employed in a thermomechanical analysis where the load and the deformation of a substance are measured as a function of temperature while changing the temperature of the substance in accordance with a controlled program, and the measurement is performed using a commercially available thermomechanical analyzer. In the window glasses of vehicles such as automobiles and trains and those of buildings where the laminated film is mainly applied, there are cases where a heat-shielding article is prepared using transparent substrates made of glass, polycarbonate, acrylic resin or the like and interlayers made of polyvinyl butyral, ethylene-vinyl alcohol copolymer or the like in combination with our multi-layer laminated film. In many of these cases, the transparent substrates, the interlayers and the laminated film are sequentially laminated in the order of: transparent substrate-interlayer-laminated film-interlayer-transparent substrate, and the resulting laminate is subsequently heated and compressed at a temperature of 100° C. to 130° C. or 150° C. to prepare a heat-shielding article. In these processing steps, the difference in the heat shrinkage behavior between the transparent substrates or interlayers and the multi-layer laminated film may cause defects in the outer appearance of the multi-layer laminated film such as wrinkles and delamination. A method of improving such defects in outer appearance by adjusting the heat shrinkage rate has been previously proposed. However, depending on the curvature of the heat-shielding article or the types of the transparent substrates and interlayers, there are cases where the outer appearance cannot be improved by controlling the heat shrinkage rate. Meanwhile, we discovered that, while polyvinyl buryrals and ethylene-vinyl alcohol copolymers that may be used in the interlayers exhibit such a behavior of softening around 100° C. and expanding in the planar direction of the film due to a force applied by compression, the difference between this heat shrinkage behavior of the interlayers and the heat shrinkage behavior of the multi-layer laminated film that is exhibited when it is heat-shrunk in the planar direction causes generation of wrinkles and delamination. In particular, we discovered that the tendency of the interlayers to particularly strongly shrink in a certain direction along with the heat-shrinking of the multi-layer laminated film becomes prominent in association with the anisotropy in the heat shrinkage behavior between the longitudinal direction of the film and the direction perpendicular thereto. We also discovered that: an interlayer having a large thickness relative to the multi-layer laminated film shows different behaviors depending on the surface because such an interlayer has different behaviors on the surface in contact with the multi-layer laminated film and on the surface in contact with the transparent substrate such that, while the surface in contact with the multi-layer laminated film is strongly influenced by the heat shrinkage behavior of the multi-layer laminated film, the surface in contact with the transparent substrate is strongly influenced by an effect associated with the compression performed in the processing step; and that this difference in behavior is the cause of the defects in the outer appearance. When the difference in the heat shrinkage stress at 100° C. between the longitudinal direction of the film and the direction perpendicular thereto is 0.05 N/mm$^2$ or less, although deformation of the multi-layer laminated film occurs in association with heat-shrinking, since the stress generated in this process acts evenly in both the film longitudinal direction and the direction perpendicular thereto, the difference in the heat shrinkage behavior on the interlayers can be reduced and the generation of wrinkles, delamination and the like can thus be easily inhibited. The difference in the heat shrinkage stress at 100° C. between the longitudinal direction of the film and the direction perpendicular thereto is more preferably 0.03 N/mm$^2$ or less. In this manner, as the difference in the heat shrinkage stress is made smaller, the anisotropy in the heat shrinkage behavior is more reduced so that superior effect of inhibiting the generation of wrinkles, delamination and the like is attained. Furthermore, it is also preferred that the difference in the heat shrinkage stress at 130° C. or 150° C. between the longitudinal direction of the film and the direction perpendicular thereto be 0.05 N/mm$^2$ or less. As described above, in the preparation of a heat-shielding article, the processing steps of sequentially laminating the transparent substrates, the interlayers and the multi-layer laminated film in the order of: transparent substrate-interlayer-multi-layer laminated film-interlayer-transparent substrate, and subsequently heating and compressing the resulting laminate at a temperature of 100° C. to 130° C. or 150° C. are performed and, by controlling the difference in the heat shrinkage stress between the film longitudinal direction and the direction perpendicular thereto to be 0.05 N/mm$^2$ or less not only at 100° C. but also in the temperature range of 100° C. to 130° C. or 150° C., the generation of defects in the outer appearance such as wrinkles and delamination can be inhibited throughout the processing steps.

It is also preferred that the difference in the dimensional change rate at 100° C. between the longitudinal direction of the film and the direction perpendicular thereto be 0.5% or less. The term "dimensional change rate" used herein is a value defined by the below-described Formula (1). In the above-described thermomechanical analysis, this value is determined by measuring the length of a multi-layer laminated film sample of 4 mm in width and about 15 mm in measurement length when the multi-layer laminated film sample is immobilized under a load of 2 g at a certain distance and the temperature is increased from room temperature to 150° C. at a rate of 10° C./minute under a constant load of 2 g. The dimensional change rate that is generally determined by measuring the sample length around room temperature actually reflects not only the dimensional change in the heating process but also the dimensional change in the cooling process. Therefore, it cannot exactly reflect the dimensional change occurring in the actual processing steps of preparing a heat-shielding article. However, since a thermomechanical analysis is capable of reproducing the actual processing steps of preparing a heat-shielding article, a film suitable for preparing a laminated glass can be obtained more appropriately. We discovered that the difference in the dimensional change rate at 100° C. is particularly important in inhibiting the generation of defects in the outer appearance such as wrinkles and delamination. That is, while a temperature of about 100° C. is where the interlayers that are used start to be soften, it is also where the multi-layer laminated film is observed to show strong effects of reversible thermal expansion. The extent of this thermal expansion is dependent on the orientation conditions of the resins constituting the respective layers of the multi-layer laminated film. However, particularly in such a multi-layer laminated film that is obtained by laminating resins having different properties, a difference is likely to be generated between the extent of thermal expansion in the film longitudinal direction and that in the direction perpendicular thereto at a temperature of about 100° C. Before the interlayers are softened, this difference in the extent of thermal expansion causes strains associated with expansion at the interfaces between the multi-layer laminated film and the interlayers, and this consequently causes defects in the outer appearance such as wrinkles and delamination. When the difference in the dimensional change rate at 100° C. between the film longitudinal direction and the direction perpendicular thereto is 0.5% or less, it is easy to control the difference in the heat shrinkage stress at 100° C. between the film longitudinal direction and the direction perpendicular thereto to be 0.05 N/mm$^2$ or less. The difference in the dimensional change rate at 100° C. between the film longitudinal direction and the direction perpendicular thereto is more preferably 0.3% or less. The smaller the difference in the dimensional change rate between the film longitudinal direction and the direction perpendicular thereto, the more likely it is that the difference in the heat shrinkage stress can also be reduced. Further, it is also preferred that the difference in the dimensional change rate at 130° C. or 150° C. between the film longitudinal direction and the direction perpendicular thereto be 0.5% or less. As described above, in the preparation of a heat-shielding article, the processing steps of sequentially laminating the transparent substrates, the interlayers and the multi-layer laminated film in the order of: transparent substrate-interlayer-multi-layer laminated film-interlayer-transparent substrate, and subsequently heating and compressing the resulting laminate at a temperature of 100° C. to 130° C. or 150° C. are performed and, by controlling the difference in the dimensional change rate between the film longitudinal direction and the direction perpendicular thereto to be 0.5% or less not only at 100° C. but also in the temperature range of 100° C. to 130° C. or 150° C., it becomes easy to control the difference in the heat shrinkage stress between the film longitudinal direction and the direction perpendicular thereto at 0.05 N/mm² or less so that generation of defects in the outer appearance such as wrinkles and delamination can be inhibited throughout the processing steps.

$$\text{Dimensional change rate}(T° C.)=(L(25° C.))-L(T° C.))/L(25° C.)\times 100 \quad (1)$$

L(T° C.): sample length at T° C.

The multi-layer laminated film used in the molded article has a heat shrinkage rate of preferably 6% or less, more preferably 3% or less, at 150° C. in the longitudinal and width directions. When the heat shrinkage rate is 6% or higher, wrinkles are generated in the edge portions of the molded article, which is not preferred.

It is preferred that the multi-layer laminated film used in the molded article have an average reflectance of 15% or less in the wavelength range of 400 nm to 700 nm and 70% or higher in the wavelength range of 850 nm to 1,200 nm. With this constitution, when the molded article is used as a window glass of a building or car, an increase in the temperature of the room or inside the car can be inhibited. It is more preferred that the multi-layer laminated film used in the molded article have an average reflectance of 15% or less in the wavelength range of 400 nm to 700 nm and 80% or higher in the wavelength range of 850 nm to 1,200 nm.

It is preferred that the multi-layer laminated film used in the molded article have an average reflectance of 15% or less in the wavelength range of 400 nm to 700 nm, 70% or higher in the wavelength range of 850 nm to 1,200 nm and 40% or higher in the wavelength range of 1,200 nm to 1,400 nm. This constitution enables the molded article to block a greater amount of thermal energy while allowing visible light rays to transmit therethrough, when the molded article is used as a window glass of a building or car, an increase in the temperature of the room or inside the car can be profoundly inhibited. It is more preferred that the multi-layer laminated film used in the molded article have an average reflectance of 15% or less in the wavelength range of 400 nm to 700 nm, 80% or higher in the wavelength range of 850 nm to 1,200 nm and 50% or higher in the wavelength range of 1,200 nm to 1,400 nm.

As a method of adjusting the reflectance in a desired wavelength range, for example, the difference in the in-plane refractive index between the A and B layers, the number of laminated layers, the layer thickness distribution, and/or the film-forming conditions (e.g., stretching ratio, stretching speed, stretching temperature, heat treatment temperature and heat treatment time) can be adjusted. As for the constitutions of the A and B layers, it is preferred that the A layers be composed using a crystalline thermoplastic resin and the B layers be composed using a resin comprising a non-crystalline thermoplastic resin as a major component. The term "resin comprising a non-crystalline thermoplastic resin as a major component" used herein refers to a resin which comprises a non-crystalline thermoplastic resin at a weight ratio of 70% or higher. From the standpoints of increasing the reflectance and thus reducing the number of laminated layers, the difference in the in-plane refractive index between the A and B layers is preferably 0.02 or larger, more preferably 0.04 or larger, still more preferably 0.08 or larger. As a method of achieving such a difference in the in-plane refractive index, a crystalline thermoplastic resin is used as at least one of the thermoplastic resins and a non-crystalline thermoplastic resin or a thermoplastic resin having a melting point that is lower than that of the above-described crystalline thermoplastic resin by 30° C. or more is used as at least one of other thermoplastic resins. In this case, a difference in the refractive index can be easily provided in the stretching or heat treatment step in the film production.

In the heat-shielding article, it is required that at least one side thereof have an average reflectance of 60% or higher in the wavelength range of 900 to 1,200 nm. In this case, the heat-shielding article is capable of providing high heat-ray shielding performance. More preferably, both sides of the heat-shielding article have an average reflectance of 60% or higher in the wavelength range of 900 to 1,200 nm. Further, it is preferred that at least one side of the heat-shielding article have an average reflectance of 70% or higher in the wavelength range of 900 to 1,200 nm. By this, high heat-ray shielding performance can be imparted to both sides of the heat-shielding article. To allow the heat-shielding article to have an average reflectance of 60% or higher in the wavelength range of 900 to 1,200 nm on at least one side, it is preferred to control the average reflectance of at least one side of the multi-layer laminated film in the heat-shielding article to be 70% or higher in the wavelength range of 900 to 1,200 nm. Further, by employing a constitution in which the multi-layer laminated film is laminated on the glass surface and the multi-layer laminated film serves as a surface, the reflection by the multi-layer laminated film can be inhibited. However, in the heat-shielding article that is intended particularly for the purpose of shielding heat rays coming from the outside, such a constitution may present a problem from the standpoints of weathering resistance and durability. In that case, it is also preferred to arrange an article showing a limited absorption in the wavelength range of 900 to 1,200 nm on the outside and it is preferred that this article have a light transmittance of 85% or higher. When such an article is used, since the light reflected by the multi-layer laminated film is released to the outside with hardly any absorption, light can be efficiently reflected.

It is preferred that the multi-layer laminated film and heat-shielding article have a visible light transmittance, which is determined in accordance with JIS R3212, of 70% or higher. Further, it is also preferred that the multi-layer laminated film and heat-shielding article have a solar total transmittance (Tts), which is defined in ISO 13837 (2008), of 50% or less.

It is required that the multi-layer laminated film used in the molded article comprise a structure in which layers composed of a thermoplastic resin (A layers) and layers composed of a thermoplastic resin having properties different from those of at least the resin constituting the A layers are alternately laminated in 51 or more layer. By laminating thermoplastic resins having different properties, the resulting film can be imparted with a function(s) that may not be attained in a single-layer film of each thermoplastic resin. The A layers and B layer are laminated in preferably 101 or more layers, more preferably 401 or more layers, still more preferably 601 or more layers. From the standpoint of increased size of a lamination apparatus, the upper limit of the number of the laminated layers is 5,000 or so. In our multi-layer laminated film, the number of the laminated layers is preferably not less than 101, more preferably not less than 401, still more preferably not less than 601. From the standpoint of increased size of a lamination apparatus, the upper limit of the number of the laminated layers is 5,000 or so. As for the layer thickness distribution, it is preferred that the optical thicknesses of the adjacent A and B layers satisfy Formula (2):

$$\lambda = 2(n_A d_A + n_B d_B) \quad (2).$$

In Formula (2), λ represents the reflection wavelength; $n_A$ represents the in-plane refractive index of the A layer; $d_A$ represents the thickness of the A layer; $n_B$ represents the in-plane refractive index of the B layer; and $d_B$ represents the thickness of the B layer.

It is also preferred that the layer thickness distribution satisfy both of the Formula (2) and Formula (3) at the same time:

$$n_A d_A = n_B d_B \qquad (3).$$

By allowing the multi-layer laminated film to have a layer thickness distribution that satisfies both of the Formulae (2) and (3) at the same time, even-order reflections can be cancelled. Accordingly, since the average reflectance in the wavelength range of 400 nm to 700 nm can be reduced while increasing the average reflectance in the wavelength range of 850 nm to 1,200 nm, a multi-layer laminated film that is transparent and exhibits high thermal energy-shielding performance can be obtained.

In addition to Formulae (2) and (3), the layer thickness distribution is also preferably expressed using the 711711 constitution (U.S. Pat. No. 5,360,659). The term "711711 constitution" refers to a laminated structure comprising repeating units, in each of which units 6 layers of A and B layers are laminated in the order of ABABAB and the optical thickness ratios of the respective layers are 7, 1, 1, 7, 1 and 1. By allowing the layer thickness distribution to have this 711711 constitution, high-order reflections can be cancelled. Accordingly, since the average reflectance in the wavelength range of 400 nm to 700 nm can be reduced while increasing the average reflectance in the wavelength range of 850 nm to 1,200 nm, a multi-layer laminated film that is transparent and exhibits even higher thermal energy-shielding performance can be obtained. Moreover, it is also preferred to adjust the reflection in the wavelength range of 850 nm to 1,200 nm by a layer thickness distribution satisfying Formulae (2) and (3) at the same time and the reflection in the wavelength range of 1,200 nm to 1,400 nm by a layer thickness distribution having the 711711 constitution. By adopting such a layer thickness constitution, light can be efficiently reflected with a small number of laminated layers.

The layer thickness distribution is preferably, for example, one in which the layer thickness increases or decreases from one side of the film to the other side, one in which the layer thickness increases from one side of the film toward the center of the film and then decreases therefrom, or one in which the layer thickness decreases from one side of the film toward the center of the film and then increases therefrom. As the mode of the changes in the layer thickness distribution, one in which the layer thickness changes sequentially in a linear manner or in a manner of geometric progression or progression of differences, or one in which 10 to 50 layers or so have almost the same layer thickness and the layer thickness changes stepwise is preferred.

As protective layers, a layer having a thickness of not less than 3 μm can be preferably arranged on both surface layers of the multi-layer laminated film. The thickness of the respective protective layers is preferably not less than 5 μm, more preferably not less than 10 μm. By increasing the thickness of the protective layers, effects of inhibiting the generation of flow marks and suppressing the ripple in the transmittance and reflectance spectrum can be attained.

It is preferred that the multi-layer laminated film have a thickness of 20 μm to 300 μm. When the thickness is less than 20 μm, the stiffness of the film is weak and the ease of handling is poor. Meanwhile, when the thickness is greater than 300 μm, the film is excessively stiff and the moldability thereof is thus poor.

It is preferred that, on the surface of the multi-layer laminated film, a functional layer(s) such as an adhesion-promoting layer, a hard coat layer, an abrasion resistant layer, a scratch resistant layer, an anti-reflection layer, a color correction layer, an ultraviolet absorption layer, a heat ray-absorbing layer, a printing layer, a gas barrier layer and/or an adhesive layer be formed.

In a molded article which comprises the multi-layer laminated film and an interlayer and a support that are laminated on at least one side of the multi-layer laminated film, lamination is generally carried out by adhesive pressure and hot-press molding is a preferred method. Examples of a support that can be used in the molded article include supports that are made of a resin, a metal, glass or ceramic. The surface of the support may be flat or curved, and the support may assume an arbitrary shape. Examples of the resin include acrylic resins such as polycarbonate, cyclic polyolefin, polyallylate, polyethylene terephthalate and polymethyl methacrylate; ABS; and triacetyl cellulose. It is preferred that the support be transparent and have a thickness of 0.5 mm to 5 mm. As the interlayer, an adhesive layer or a film layer is preferred. Examples of the adhesive include vinyl acetate resin-based adhesives, vinyl chloride-vinyl acetate copolymer-based adhesives, ethylene-vinyl acetate copolymer-based adhesives, polyvinyl alcohol, polyvinyl butyral, polyvinyl acetal, polyvinyl ether, nitrile rubber-based adhesives, styrene-butadiene rubber-based adhesives, natural rubber-based adhesives, chloroprene rubber-based adhesives, polyamide-based adhesives, epoxy resin-based adhesives, polyurethane-based adhesives, acrylic resin-based adhesives, cellulose-based adhesives, polyvinyl chloride, polyacrylate and polyisobutylene. Further, to these adhesives, for example, an adhesion adjusting agent, a plasticizer, a heat stabilizer, an antioxidant, an ultraviolet absorber, an antistatic agent, a lubricant, a coloring agent and/or a cross-linking agent may be added as well. By arranging the interlayer, the adhesion between the support and the multi-layer laminated film as well as the functions of the molded article such as designability, durability, weathering resistance and impact resistance can be improved. As a method of improving the design, a coloring agent may be used, and examples thereof include azo-type pigments, polycyclic pigments, lake-type pigments, nitro-type pigments, nitroso-type pigments, aniline black, alkali blue, phthalocyanine-based pigments, cyanine-based pigments, azo-based dyes, anthraquinone-based dyes, quinophthalone-based dyes, methine-based dyes, polycyclic dyes, reactive dyes, cationic dyes, anthanum hexaboride, indium tin oxide, antimony tin oxide and cesium tungsten oxide. It is preferred that the interlayer have a thickness of 10 μm to 1 mm. Examples of a molding method include extrusion lamination, hot-melt lamination, thermal lamination, press lamination, vacuum lamination and autoclave lamination. The extrusion lamination is a method in which a multi-layer laminated film in a molten state and an interlayer are each extruded from a die into a sheet form and laminated on a support and the resulting laminate is then passed through between two rolls to produce a molded article. The hot-melt lamination is a molding method in which a heat-melted interlayer is coated on a multi-layer laminated film or support and the multi-layer laminated film and support are then laminated. The thermal lamination is a molding method in which a multi-layer laminated film, an interlayer and a support are press-adhered while being heated by a heating roll. The press lamination is a molding method in which a multi-layer laminated film, an interlayer and a support are press-adhered and then laminated using a press machine. The vacuum lamination is a molding method in which a multi-layer laminated film, an interlayer and a support are heated and subsequently press-laminated under a vacuum condition in an apparatus. The autoclave lamination is a molding method in which a multi-layer laminated film, an interlayer and a support are heated and then laminated under pressure applied by a gas or the like in an apparatus.

Examples of the molded article comprising the multi-layer laminated film also include those molded articles in which an interlayer and a support are laminated on both sides of the multi-layer laminated film.

Examples of an application of the molded article comprising the multi-layer laminated film include casings of cellular phones and personal computers; exteriors of electrical appliances and furnitures; and windows of buildings and automobiles.

Examples of a specific example of producing our multi-layer laminated film will now be described.

The laminated structure of 51 or more layers in the multi-layer laminated film can be produced by the following method. For example, a method in which thermoplastic resins are supplied from two extruders A and B that correspond to A and B layers, respectively, and the polymers from each flow channel are laminated in 51 or more layers by using a multimanifold-type feed block and a square mixer, which are known lamination equipments, or by using only a comb-type feed block, and the resulting molten laminate is melt-extruded into a sheet form via a T-die or the like and then cooled and solidified on a casting drum to obtain an unstretched film can be employed. As a method of improving the accuracy of laminating the A and B layers, the method described in JP-A 2007-307893, Japanese Patent No. 4691910 or Japanese Patent No. 4816419 is preferably employed. Further, it is also preferred that, as required, the thermoplastic resin used for the A layers and the thermoplastic resin used for the B layers be subjected to drying.

Subsequently, the thus obtained unstretched film is subjected to biaxial stretching and a heat treatment. As for the stretching method, it is preferred that the unstretched film be biaxially stretched by a known sequential biaxial stretching method or simultaneous biaxial stretching method. The "known sequential biaxial stretching method" refers to a method in which an unstretched film is stretched in the longitudinal direction and then in the width direction or a method in which an unstretched film is stretched in the width direction and then in the longitudinal direction, and the stretching in the longitudinal direction and the stretching in the width direction may be performed a plurality of times in combination.

The biaxial stretching is generally performed in the range of the higher glass transition temperature of the A layer or B layer to a temperature that is not more than 50° C. higher than this glass transition temperature, and the heat treatment is performed at a temperature that is higher than the stretching temperature but lower than the higher melting point of the A layer or B layer.

A case where polyethylene terephthalate is used for the A layers and polyethylene terephthalate copolymerized with 33 mol % of a cyclohexane dimethanol component is used for the B layers and the resulting laminate is subjected to sequential biaxial stretching or simultaneous biaxial stretching and then a heat treatment will now be described. When performing sequential biaxial stretching, the unstretched film casted on a cooling roll is stretched by a longitudinal stretching machine at a temperature of 80° C. to 120° C., preferably 80° C. to 100° C. from the standpoint of thickness variation, and a draw ratio of 2 to 6, preferably 3 to 4, utilizing the changes in the speed of the rolls of the longitudinal stretching machine.

Particularly in the multi-layer laminated film, it is also preferred to enhance the orientation in the longitudinal stretching. In ordinary sequential biaxial stretching, the orientation tends to be enhanced in the film width direction and this causes a difference in the heat shrinkage stress between the film longitudinal direction and the direction perpendicular thereto (film width direction). In this case, by enhancing the orientation in longitudinal stretching, the orientation state in the film width direction and that in the machine direction (longitudinal direction) can be adjusted at the same level, and this makes it easy to allow the resulting film to have a difference of 0.05 N/mm$^2$ or less in the heat shrinkage stress at 100° C. and 130° C. or 150° C. between the film longitudinal direction and the direction perpendicular thereto and to have a difference of 0.5% or less in the dimensional change rate at 100° C. and 130° C. or 150° C. between the film longitudinal direction and the direction perpendicular thereto. As for the stretching conditions preferred for the orientation enhancement, the stretching is performed in the range of ±5° C. of the glass transition temperature. For instance, when polyethylene terephthalate having a glass transition temperature of about 80° C. is used, the stretching is preferably performed at 75 to 85° C. at a draw ratio of not less than 3.5. In this case, not only generation of a difference in the heat shrinkage stress can be inhibited, but also irregularity in the film thickness can be effectively suppressed.

The uniaxially stretched film obtained in this manner may be subjected to, as required, a surface treatment such as corona treatment, flame treatment or plasma treatment, and then a function(s) such as lubricity, adhesiveness and/or antistaticity can be imparted thereto by in-line coating.

Thereafter, using a transverse stretching machine, the uniaxially stretched film is stretched at a temperature of 80° C. to 130° C., preferably 90° C. to 120° C., and a draw ratio of 2 to 6, preferably 3 to 4. As a method of stretching the film in the width direction, a known tenter method can be employed. That is, by conveying the film in a tenter while holding it with clips at both ends and then widening the gap between the clips, the film is stretched in the width direction.

Particularly in the multi-layer laminated film, to control the difference in the heat shrinkage stress at 100° C. and 130° C. or 150° C. between the film longitudinal direction and the direction perpendicular thereto to be 0.05 N/mm$^2$ or less and the difference in the dimensional change rate at 100° C. and 130° C. or 150° C. between the film longitudinal direction and the direction perpendicular thereto to be 0.5% or less, it is preferred to adjust the draw ratio in the film width direction. The draw ratio in the film width direction and the heat shrinkage stress are notably related to each other and a high draw ratio allows the resins to be fixed while a large strain force is maintained in the film width direction, and this strain is observed as stress when released at a processing temperature of 100° C. to 130° C. or 150° C. By adjusting the draw ratio, the amount of stored strain can be controlled, and this makes it easy to allow the resulting film to have a difference of 0.05 N/mm$^2$ or less in the heat shrinkage stress at 100° C. and 130° C. or 150° C. between the film longitudinal direction and the direction perpendicular thereto. Although the transverse draw ratio depends also on the stretching conditions in the preceding longitudinal stretching step, when polyethylene terephthalate is used as a thermoplastic resin, the transverse draw ratio is particularly preferably 3.0 to 4.0.

Further, in the same manner as the draw ratio, it is also important to adjust the stretching temperature. This is because the lower the stretching temperature, the larger becomes the strain generated during stretching and, consequently, the larger becomes the heat shrinkage stress observed at a processing temperature of 100° C. to 130° C. or 150° C. Although the transverse stretching temperature depends also on the stretching conditions in the preceding longitudinal stretching step, when polyethylene terephthalate is used as a thermoplastic resin, the transverse stretching is particularly preferably performed at a temperature of 90° C. to 130° C.

A case where simultaneous biaxial stretching is performed will now be described. The unstretched film casted on a cooling roll is guided to a simultaneous biaxial tenter and conveyed therein while being held with clips at both ends, thereby being stretched in the longitudinal and width directions simultaneously and/or stepwise. The stretching in the longitudinal direction is achieved by widening the distance between the chips of the tenter, while the stretching in the width direction is achieved by widening the gap between the rails on which the clips travel. It is preferred that the tenter clips used for performing the stretching and heat treatment be driven by a linear motor system. In addition, there are also pantograph-type and screw-type tenter clips; however, thereamong, linear motor-type tenter clips are excellent in that each clip has a high degree of freedom and the draw ratio can thus be freely changed. The stretching temperature and draw ratio of the simultaneous biaxial stretching are similar to those of the sequential biaxial stretching. That is, the stretching temperature is 80° C. to 120° C. and the draw ratio is, in terms of area ratio, 4 to 36, preferably 9 to 16.

Subsequently, using a heat treatment apparatus, the thus stretched film is subjected to a heat treatment. The heat treatment is normally performed in a transverse stretching machine (tenter). After transverse stretching, the heat treatment is performed at a temperature of 160° C. to 220° C. and a relaxation ratio of 0% to 10%, preferably 0% to 5%. The relaxation may be performed only in the width or longitudinal direction, or may be performed in both the width and longitudinal directions.

It is preferred that the post-stretching heat treatment be performed at a temperature not higher than the melting point of at least one of the thermoplastic resins and not lower than the melting point of at least one of other thermoplastic resins. In this case, while one of the thermoplastic resins maintains a highly oriented state, the orientation of the other thermoplastic resin is relaxed; therefore, not only a difference in the refractive index can be easily generated between these resins, but also the heat shrinkage stress can be easily reduced in association with the relaxation of the orientation. Accordingly, it also becomes easy to control the difference in the heat shrinkage stress at 100° C. and 130° C. or 150° C. between the film longitudinal direction and the direction perpendicular thereto to be 0.05 N/mm$^2$ or less.

Further, following the heat treatment, it is preferred that the resulting film be cooled at a temperature that is 70° C. or higher and lower than the heat treatment temperature by 20° C. or more, and it is also preferred that the film be relaxed during the cooling. Particularly, to lower the heat shrinkage stress kick-off temperature, it is effective to cool the film to control the film temperature to be 80° C. or lower at the outlet of the transverse stretching machine where the film is released from the clips.

Still further, it is also preferred to perform the heat treatment step and then slight stretching of 2% to 10%. The slight stretching may be performed only in the width or longitudinal direction, or may be performed in both the width and longitudinal directions.

Lastly, by winding the resulting film using a winding apparatus, the multi-layer laminated film is produced.

EXAMPLES

The molded article will now be described by way of specific examples thereof. Even when a thermoplastic resin other than those specifically exemplified below is used, the multilayer laminated film can be obtained in the same manner by referring to the descriptions of the present specification including the below-described Examples.
Method of Measuring Physical Properties and Method of Evaluating Effects The physical property values and effects were evaluated by the methods described below.
(1) Heat Shrinkage Stress and Heat Shrinkage Stress Kick-Off Temperature Using EXSTAR TMS/SS 6000 manufactured by Seiko Instruments Inc., measurements were carried out in the longitudinal and width directions of a 20 mm×4 mm film sample (measurement length: 15 mm) at a temperature of 25° C. to 200° C. By dividing the thus obtained load data by the pre-measurement cross-sectional area of the film, the values of the heat shrinkage stress at 110° C., 130° C. and 150° C. were determined. Further, the heat shrinkage stress kick-off temperature was defined as, in a heat shrinkage stress curve, the temperature at the intersection between the baseline preceding the initial rise of the heat shrinkage stress and a tangent line drawn at a point where the curve has the maximum slope after the initial rise.
(2) Heat Shrinkage Rate A sample having a size of 150 mm×10 mm was cut out and marks were made on the sample at an interval of 100 mm in the longitudinal direction. The distance between the marks was measured using a universal projector manufactured by Nikon Corporation (Model V-16A) and the measured value was defined as "A." Then, the sample was suspended in a Geer oven under a load of 3 g and left to stand for 30 minutes in a 150° C. atmosphere. Subsequently, the sample was taken out and cooled and the distance between the marks previously made was measured as "B." The heat shrinkage rate was determined using the following Formula (3). The number of measurements, n, was 3 and an average thereof was calculated. The measurements were carried out in each of the film longitudinal and width directions.

$$\text{Heat shrinkage rate}(\%)=100\times(A-B)/A \qquad (3)$$

(3) Average Reflectance

A spectrophotometer manufactured by Hitachi, Ltd. (U-4100 Spectrophotometer) was fitted with a 12° specular reflection attachment P/N134-0104, and the absolute reflectance was measured in the wavelength range of 250 to 2,600 nm at an incident angle (φ) of 12°. As for the measurement conditions, a slit of 2 nm (visible)/automatic control (infrared) was used; the gain was set at 2; and the scanning rate was 600 nm/min. A sample having a size of 5 cm×5 cm was cut out from the central portion of the subject film in the transverse direction and then subjected to the measurement. From the results of the measurement, the average reflectance was determined in the respective wavelength ranges of 400 nm to 800 nm, 400 nm to 700 nm, 850 nm to 1,200 nm and 1,200 nm to 1,400 nm.

(4) Outer Appearance of Molded Article (Irregularities)

On the subject molded article placed under a fluorescent lamp, the part to be evaluated was visually observed at angles of 20°, 50° and 70° with respect to the normal line direction. The following evaluation criteria were used:
A: No irregularity was visible.
B: Only a few irregularities were observed.
C: Irregularities were observed.

(5) Outer Appearance of Molded Article (Wrinkles)

On the subject molded article placed under a fluorescent lamp, the part to be evaluated was visually observed at an angle of 20° with respect to the normal line direction. The following evaluation criteria were used:
A: No wrinkle was visible.
C: Wrinkles were observed.

(6) Difference in Heat Shrinkage Stress and Difference in Dimensional Change Rate Using a Thermo-Stress-Strain Analyzer Manufactured by Seiko Instruments Inc. (TMA/SS 6000), the measurements were carried out under the below-described conditions. As for the data, at least one measurement was made per 1° C. The dimensional change rate was calculated using Formula (1). The difference in the heat shrinkage stress and the difference in the dimensional change rate were each determined as an absolute value obtained by subtracting the value in the width direction from the value in the longitudinal direction.

Sample size: 4 mm in width, 15 mm in length
Heating range: 25 to 200° C.
Heating rate: 10° C./minute
Measurement load: 19.8N
Temperature: 23° C., Relative humidity: 65%, in atmosphere (7) Amount of Melting Heat of Thermoplastic Resins A and B From each of the thermoplastic resins A and B, a sample was collected in an amount of 5 mg. The samples were each measured in accordance with JIS K7122 (1987) using a differential scanning calorimetry (DSC) analyzer, EXSTAR DSC6220 manufactured by Seiko Instruments Inc., to determine the amount of melting heat. The measurement was carried out by increasing the temperature at a rate of 5° C./min from 25° C. to 290° C. and the value integrated from the baseline in the range of the melting point±20° C. was defined as the amount of melting heat. Further, in this case, the melting point was defined as the temperature of the point at which the difference from the baseline was the largest in the DSC. A resin having an amount of melting heat of not less than 20 J/g was defined as a crystalline resin and a resin having an amount of melting heat of 5 J/g or less was defined as a non-crystalline resin.

Resins used in Multi-layer Laminated Film

Resin A: polyethylene terephthalate having an IV of 0.65 (crystalline polyester, melting point: 255° C.)
Resin B: a copolymer of polyethylene terephthalate having an IV of 0.73 (polyethylene terephthalate copolymerized with 33 mol % of a cyclohexane dimethanol component; non-crystalline polyester)
Resin C: a copolymer of polyethylene terephthalate having an IV of 0.72 (polyethylene terephthalate copolymerized with 20 mol % of a cyclohexane dicarboxylic acid component and 20 mol % of a spiroglycol component; non-crystalline polyester)
Resin D: a material produced by compounding 20% by mass of the resin A and 80% by mass of the resin C Method of Measuring IV (Intrinsic Viscosity)

Resin E: a copolymer of polyethylene terephthalate having an IV of 0.65 (polyethylene terephthalate copolymerized with 12 mol % of an isophthalic acid component; crystalline polyester, melting point: 222° C.)

O-chlorophenol was used as a solvent and the solution viscosity was measured at a temperature of 25° C. using an Ostwald viscometer. The intrinsic viscosity was determined from the thus obtained solution viscosity value.

Example 1

Resins A and B were used as a thermoplastic resin constituting A layers (hereinafter, also referred to as "thermoplastic resin A") and a thermoplastic resin constituting B layers (hereinafter, also referred to as "thermoplastic resin B," respectively. The thermoplastic resins A and B were each melted at 280° C. using an extruder and filtered through five FSS-type leaf disk filter. Subsequently, while measuring the amounts of the thermoplastic resins A and B using a gear pump such that a discharge ratio (lamination ratio), thermoplastic resin A/thermoplastic resin B, of 4/1 was attained, the thermoplastic resins A and B were converged in a 51-layer feed block to produce a laminate having a constant layer thickness distribution (in a film thickness of 50 μm, the resins were laminated such that each A layer had a thickness of 1.54 μm and each B layer had a thickness of 0.4 μm) in which the resins were alternately laminated in 51 layers (26 A layers and 25 B layers) in the thickness direction. The thus obtained laminate was fed to a T-die and molded into a sheet form and, while applying a static voltage of 8 kV using a wire, the resulting sheet was then rapidly cooled and solidified on a casting drum whose surface temperature was maintained at 25° C., thereby obtaining an unstretched film. This unstretched film was longitudinally stretched at a temperature of 90° C. and a draw ratio of 3.3 and then introduced to a tenter where the resulting film was held by clips at both ends. After transversely stretching this film at temperature of 90° C. and a draw ratio of 4.0, the thus stretched film was heat-treated for 10 seconds at 220° C. and then subjected to 3% relaxation in the width direction. Thereafter, the resulting film was cooled for 10 seconds at 150° C. to obtain a 50 μm-thick multi-layer laminated film. The thus obtained multi-layer laminated film had a temperature of 60° C. at the outlet of transverse stretching apparatus where the film was released from the clips. For the preparation of a molded article, LAMINATOR 0303S manufactured by Nisshinbo Holdings Inc. was used. A 10 cm-square glass plate of 3 mm in thickness was laminated as a support on each side of the multi-layer laminated film and, as an interlayer, PVB (polyvinyl butyral) was arranged in a thickness of 0.7 mm between the multi-layer laminated film and each support. The resultant was vacuumed at 140° C. for 5 minutes and then pressed for 10 minutes. The results of evaluating the physical properties of the multi-layer laminated film and the outer appearance of the thus obtained molded article are summarized in Table 1.

Example 2

A multi-layer laminated film was obtained under the same conditions as in Example 1, except that the heat treatment temperature was changed to 205° C. The thus obtained multi-layer laminated film had a temperature of 60° C. at the outlet of transverse stretching apparatus where the film was released from the clips. From this multi-layer laminated film, a molded article was prepared in the same manner as in Example 1. The results of evaluating the physical properties of the multi-layer laminated film and the outer appearance of the thus obtained molded article are summarized in Table 1.

Example 3

A multi-layer laminated film was obtained under the same conditions as in Example 1, except that the heat treatment temperature was changed to 205° C. and the amount of the relaxation in the width direction was changed to 1%. The thus obtained multi-layer laminated film had a temperature of 60° C. at the outlet of transverse stretching apparatus where the film was released from the clips. From this multi-layer laminated film, a molded article was prepared in the same manner as in Example 1. The results of evaluating the physical properties of the multi-layer laminated film and the outer appearance of the thus obtained molded article are summarized in Table 1.

Example 4

A multi-layer laminated film was obtained under the same conditions as in Example 1, except that the heat treatment temperature was changed to 195° C. and the amount of the relaxation in the width direction was changed to 1%. From the thus obtained multi-layer laminated film, a molded article was prepared in the same manner as in Example 1. The multi-layer laminated film had a temperature of 60° C. at the outlet of transverse stretching apparatus where the film was released from the clips. The results of evaluating the physical properties of the multi-layer laminated film and the outer appearance of the molded article are summarized in Table 1.

Example 5

A multi-layer laminated film was obtained under the same conditions as in Example 1, except that the heat treatment temperature was changed to 205° C. and the film was subjected to slight stretching of 4% during the heat treatment before being subjected to the 3% relaxation in the width direction. The thus obtained multi-layer laminated film had a temperature of 60° C. at the outlet of transverse stretching apparatus where the film was released from the clips. From this multi-layer laminated film, a molded article was prepared in the same manner as in Example 1. The results of evaluating the physical properties of the multi-layer laminated film and the outer appearance of the thus obtained molded article are summarized in Table 1.

Example 6

A multi-layer laminated film was obtained under the same conditions as in Example 1, except that the heat treatment temperature was changed to 160° C. The thus obtained multi-layer laminated film had a temperature of 60° C. at the outlet of transverse stretching apparatus where the film was released from the clips. From this multi-layer laminated film, a molded article was prepared in the same manner as in Example 1. The results of evaluating the physical properties of the multi-layer laminated film and the outer appearance of the thus obtained molded article are summarized in Table 1.

Comparative Example 1

A multi-layer laminated film was obtained under the same conditions as in Example 1, except that the heat treatment temperature was changed to 240° C. The thus obtained multi-layer laminated film had a temperature of 60° C. at the outlet of transverse stretching apparatus where the film was released from the clips. From this multi-layer laminated film, a molded article was prepared in the same manner as in Example 1. The results of evaluating the physical properties of the multi-layer laminated film and the outer appearance of the thus obtained molded article are summarized in Table 1.

Comparative Example 2

A multi-layer laminated film was obtained under the same conditions as in Example 1, except that the draw ratio in the longitudinal stretching was changed to 4; the heat treatment temperature was changed to 240° C.; and the amount of the relaxation in the width direction was changed to 1%. The thus obtained multi-layer laminated film had a temperature of 60° C. at the outlet of transverse stretching apparatus where the film was released from the clips. From this multi-layer laminated film, a molded article was prepared in the same manner as in Example 1. The results of evaluating the physical properties of the multi-layer laminated film and the outer appearance of the thus obtained molded article are summarized in Table 1.

Comparative Example 3

A multi-layer laminated film was obtained under the same conditions as in Example 1, except that the draw ratio in the longitudinal stretching was changed to 2.8; the heat treatment temperature was changed to 205° C.; the amount of the relaxation in the width direction was changed to 1%; and the film was further subjected to 1% relaxation in the width direction during the 10-second cooling at 150° C. The thus obtained multi-layer laminated film had a temperature of 60° C. at the outlet of transverse stretching apparatus where the film was released from the clips. From this multi-layer laminated film, a molded article was prepared in the same manner as in Example 1. The results of evaluating the physical properties of the multi-layer laminated film and the outer appearance of the thus obtained molded article are summarized in Table 1.

Comparative Example 4

A multi-layer laminated film was obtained under the same conditions as in Example 1, except that the heat treatment temperature was changed to 150° C. The thus obtained multi-layer laminated film had a temperature of 60° C. at the outlet of transverse stretching apparatus where the film was released from the clips. From this multi-layer laminated film, a molded article was prepared in the same manner as in Example 1. The results of evaluating the physical properties of the multi-layer laminated film and the outer appearance of the thus obtained molded article are summarized in Table 1.

Example 7

A 100 µm-thick multi-layer laminated film was obtained under the same conditions as in Example 1, except that the resins A and D were used for the A and B layers, respectively; and that the A and B layers were alternately laminated in the thickness direction in a total of 501 layers (251 A layers and 250 B layers) such that the adjacent A and B layers satisfied Formulae (1) and (2) and the thicknesses of the A layers and the B layers changed in a geometrically progressive manner from the one side of the film toward the other side in the ranges of 130 nm to 180 nm and 137 nm to 190 nm, respectively (it is noted here that the thickness of the A layers arranged as the outermost layers was increased to a final thickness of 10 μm). The thus obtained multi-layer laminated film had a temperature of 60° C. at the outlet of transverse stretching apparatus where the film was released from the clips. From this multi-layer laminated film, a molded article was prepared in the same manner as in Example 1. The results of evaluating the physical properties of the multi-layer laminated film and the outer appearance of the thus obtained molded article are summarized in Table 1.

Example 8

A multi-layer laminated film was obtained under the same conditions as in Example 7, except that the heat treatment temperature was changed to 205° C. The thus obtained multi-layer laminated film had a temperature of 60° C. at the outlet of transverse stretching apparatus where the film was released from the clips. From this multi-layer laminated film, a molded article was prepared in the same manner as in Example 1. The results of evaluating the physical properties of the multi-layer laminated film and the outer appearance of the thus obtained molded article are summarized in Table 1.

Example 9

A multi-layer laminated film was obtained under the same conditions as in Example 7, except that the heat treatment temperature was changed to 205° C. and the amount of the relaxation in the width direction was changed to 1%. The thus obtained multi-layer laminated film had a temperature of 60° C. at the outlet of transverse stretching apparatus where the film was released from the clips. From this multi-layer laminated film, a molded article was prepared in the same manner as in Example 1. The results of evaluating the physical properties of the multi-layer laminated film and the outer appearance of the thus obtained molded article are summarized in Table 1.

Example 10

A multi-layer laminated film was obtained under the same conditions as in Example 7, except that the heat treatment temperature was changed to 195° C. and the amount of the relaxation in the width direction was changed to 1%. The thus obtained multi-layer laminated film had a temperature of 60° C. at the outlet of transverse stretching apparatus where the film was released from the clips. From this multi-layer laminated film, a molded article was prepared in the same manner as in Example 1. The results of evaluating the physical properties of the multi-layer laminated film and the outer appearance of the thus obtained molded article are summarized in Table 1.

Example 11

A multi-layer laminated film was obtained under the same conditions as in Example 7, except that the heat treatment temperature was changed to 205° C. and the film was subjected to slight stretching of 4% during the heat treatment before being subjected to the 3% relaxation in the width direction. The thus obtained multi-layer laminated film had a temperature of 60° C. at the outlet of transverse stretching apparatus where the film was released from the clips. From this multi-layer laminated film, a molded article was prepared in the same manner as in Example 1. The results of evaluating the physical properties of the multi-layer laminated film and the outer appearance of the thus obtained molded article are summarized in Table 1.

Comparative Example 5

A multi-layer laminated film was obtained under the same conditions as in Example 7, except that the heat treatment temperature was changed to 240° C. The thus obtained multi-layer laminated film had a temperature of 60° C. at the outlet of transverse stretching apparatus where the film was released from the clips. From this multi-layer laminated film, a molded article was prepared in the same manner as in Example 1. The results of evaluating the physical properties of the multi-layer laminated film and the outer appearance of the thus obtained molded article are summarized in Table 1.

Example 12

Using the resins A and D for the A and B layers, respectively, 250 A layers and 250 B layers were alternately laminated in the thickness direction in a total of 500 layers such that the adjacent A and B layers satisfied the Formulae (1) and (2) and the thicknesses of the A layers and the B layers changed in a geometrically progressive manner from the one side of the film toward the other side in the ranges of 130 nm to 180 nm and 137 nm to 190 nm, respectively (it is noted here that the A layer was arranged on the film surface side and the thickness of the A layer arranged on the film surface was increased to a final thickness of 10 μm). Then, 50 units of 711711 constitution were laminated (150 A layers and 150 A layers were alternately laminated in the thickness direction in a total of 300 layers). In the 711711 constitution, throughout each of the 50 units, the layer thickness of the A layer corresponding to "7," that of the B layer corresponding to "7," that of the A layer corresponding to "1" and that of the B layer corresponding to "1" were changed in a geometrically progressive manner in the ranges of 135 nm to 165 nm, 145 nm to 177 nm, 20 nm to 24 nm and 21 nm to 25 nm, respectively. Further, another A layer whose thickness was increased to a final thickness of 10 μm was also laminated (the final layer constitution was: 10-μm A layer/layer constitution satisfying the Formulae (1) and (2)/711711 constitution/10-μm A layer). Except these points, a 120 μm-thick multi-layer laminated film was obtained under the same conditions as in Example 3. The thus obtained multi-layer laminated film had a temperature of 60° C. at the outlet of transverse stretching apparatus where the film was released from the clips. From this multi-layer laminated film, a molded article was prepared in the same manner as in Example 1. The results of evaluating the physical properties of the multi-layer laminated film and the outer appearance of the thus obtained molded article are summarized in Table 1.

Example 13

A multi-layer laminated film was obtained under the same conditions as in Example 12, except that the heat treatment temperature was changed to 205° C. and the film was subjected to slight stretching of 4% during the heat treatment before being subjected to the 3% relaxation in the width direction. The thus obtained multi-layer laminated film had a temperature of 60° C. at the outlet of transverse stretching apparatus where the film was released from the clips. From this multi-layer laminated film, a molded article was prepared in the same manner as in Example 1. The results of evaluating the physical properties of the multi-layer laminated film and the outer appearance of the thus obtained molded article are summarized in Table 1.

Comparative Example 6

A multi-layer laminated film was obtained under the same conditions as in Example 12, except that the heat treatment temperature was changed to 240° C. The thus obtained multi-layer laminated film had a temperature of 60° C. at the outlet of transverse stretching apparatus where the film was released from the clips. From this multi-layer laminated film, a molded article was prepared in the same manner as in Example 1. The results of evaluating the physical properties of the multi-layer laminated film and the outer appearance of the thus obtained molded article are summarized in Table 1.

Example 14

A 25 μm-thick multi-layer laminated film was obtained under the same conditions as in Example 1, except that the resins A and B were used for the A and B layers, respectively; and that the A and B layers were alternately laminated in the thickness direction in 51 layers (26 A layers and 25 B layers) such that the adjacent A and B layers satisfied the Formulae (1) and (2) and the thicknesses of the A layers and the B layers changed in a geometrically progressive manner from the one side of the film toward the other side in the ranges of 60 nm to 100 nm and 64 nm to 127 nm, respectively (it is noted here that the thickness of the A layers arranged as the outermost layers was increased to a final thickness of 10 μm). The thus obtained multi-layer laminated film had a temperature of 60° C. at the outlet of transverse stretching apparatus where the film was released from the clips. From this multi-layer laminated film, a molded article was prepared in the same manner as in Example 1. The results of evaluating the physical properties of the multi-layer laminated film and the outer appearance of the thus obtained molded article are summarized in Table 1.

Example 15

A 100 μm-thick multi-layer laminated film was obtained under the same conditions as in Example 1, except that the resins A and D were used for the A and B layers, respectively; and that the A and B layers were alternately laminated in the thickness direction in a total of 501 layers (251 A layers and 250 B layers) such that the adjacent A and B layers satisfied Formula (1) and the thicknesses of the A layers and the B layers changed in a geometrically progressive manner from the one side of the film toward the other side in the ranges of 119 nm to 167 nm and 151 nm to 213 nm, respectively (it is noted here that the thickness of the A layers arranged as the outermost layers was increased to a final thickness of 10 μm). The thus obtained multi-layer laminated film had a temperature of 60° C. at the outlet of transverse stretching apparatus where the film was released from the clips. From this multi-layer laminated film, a molded article was prepared in the same manner as in Example 1. The results of evaluating the physical properties of the multi-layer laminated film and the outer appearance of the thus obtained molded article are summarized in Table 1. Comparing to Example 7, since the layer thickness distribution did not satisfy Formula (2), the reflectance was high in the wavelength range of 400 nm to 700 nm and irregularities formed on the molded article was easily observed.

Example 16

A multi-layer laminated film was obtained under the same conditions as in Example 11, except that the resin E was used for the B layers. The thus obtained multi-layer laminated film had a temperature of 60° C. at the outlet of transverse stretching apparatus where the film was released from the clips. From this multi-layer laminated film, a molded article was prepared in the same manner as in Example 1. The results of evaluating the physical properties of the multi-layer laminated film and the outer appearance of the thus obtained molded article are summarized in Table 1.

Comparative Example 7

A multi-layer laminated film was obtained under the same conditions as in Example 2, except the film was not cooled after the heat treatment. The thus obtained multi-layer laminated film had a temperature of 95° C. at the outlet of transverse stretching apparatus where the film was released from the clips. From the thus obtained multi-layer laminated film, a molded article was produced in the same manner as in Example 1. The results of evaluating the physical properties of the multi-layer laminated film and the outer appearance of the molded article are summarized in Table 1. The thus obtained film had a high heat shrinkage stress kick-off temperature and the molded article was observed to have conspicuous irregularities.

TABLE 1-1

| | Heat shrinkage stress (MPa) | | | | | | Heat shrinkage stress kick-off temperature (° C.) | | Heat shrinkage rate (%) | |
| | 150° C. | | 130° C. | | 110° C. | | | | | |
| | Longitudinal direction | Width direction | Longitudinal direction | Width direction | Longitudinal direction | Width direction | Longitudinal direction | Width direction | Longitudinal direction | Width Direction |
|---|---|---|---|---|---|---|---|---|---|---|
| Example 1 | 1.2 | 0.8 | 0.5 | 0.4 | 0.3 | 0.0 | 108 | 114 | 1.8 | 1.8 |
| Example 2 | 2.4 | 2.2 | 2.2 | 1.6 | 0.4 | 0.4 | 105 | 112 | 2.8 | 2.7 |
| Example 3 | 2.4 | 2.4 | 2.2 | 2.0 | 0.4 | 0.5 | 105 | 106 | 3.0 | 3.1 |
| Example 4 | 3.0 | 2.8 | 2.7 | 2.6 | 0.9 | 0.9 | 103 | 104 | 3.5 | 3.7 |
| Example 5 | 2.6 | 3.7 | 2.3 | 3.4 | 0.7 | 1.6 | 105 | 95 | 3.1 | 4.1 |
| Example 6 | 4.3 | 3.9 | 3.7 | 3.2 | 1.2 | 0.4 | 98 | 102 | 9.5 | 9.5 |
| Comparative Example 1 | 0.2 | 0.4 | 0.0 | 0.1 | 0.0 | 0.0 | 135 | 122 | 1.1 | 1.2 |

TABLE 1-1-continued

|  | Heat shrinkage stress (MPa) | | | | | | Heat shrinkage stress kick-off temperature (° C.) | | Heat shrinkage rate (%) | |
| --- | --- | --- | --- | --- | --- | --- | --- | --- | --- | --- |
|  | 150° C. | | 130° C. | | 110° C. | | | | | |
|  | Longitudinal direction | Width direction | Longitudinal direction | Width direction | Longitudinal direction | Width direction | Longitudinal direction | Width direction | Longitudinal direction | Width Direction |
| Comparative Example 2 | 0.8 | 0.8 | 0.3 | 0.4 | 0.0 | 0.0 | 122 | 115 | 1.4 | 1.3 |
| Comparative Example 3 | 0.3 | 0.3 | 0.3 | 0.3 | 0.2 | 0.2 | 107 | 108 | 0.6 | 0.5 |
| Comparative Example 4 | 6.2 | 5.5 | 5.2 | 4.7 | 2.0 | 1.6 | 97 | 101 | 12.2 | 11.1 |
| Example 7 | 0.9 | 0.6 | 0.4 | 0.3 | 0.2 | 0.0 | 108 | 114 | 1.3 | 1.3 |
| Example 8 | 1.8 | 1.6 | 1.6 | 1.2 | 0.4 | 0.3 | 105 | 112 | 2.1 | 2.0 |
| Example 9 | 1.8 | 1.8 | 1.6 | 1.5 | 0.4 | 0.4 | 105 | 106 | 2.2 | 2.3 |
| Example 10 | 2.2 | 2.2 | 2.0 | 1.9 | 0.7 | 0.7 | 103 | 104 | 2.6 | 2.7 |
| Example 11 | 1.9 | 2.7 | 1.7 | 2.5 | 0.5 | 1.2 | 105 | 95 | 2.3 | 2.9 |
| Comparative Example 5 | 0.2 | 0.3 | 0.0 | 0.1 | 0.0 | 0.0 | 135 | 122 | 0.9 | 0.8 |
| Example 12 | 1.8 | 1.7 | 1.6 | 1.5 | 0.4 | 0.4 | 105 | 106 | 2.2 | 2.3 |
| Example 13 | 1.9 | 2.7 | 1.7 | 2.5 | 0.5 | 1.2 | 105 | 95 | 2.3 | 2.9 |
| Comparative Example 6 | 0.2 | 0.3 | 0.0 | 0.1 | 0.0 | 0.0 | 135 | 122 | 0.9 | 0.8 |
| Example 14 | 1.4 | 1.0 | 0.6 | 0.4 | 0.3 | 0.0 | 107 | 113 | 1.8 | 1.8 |
| Example 15 | 0.9 | 0.6 | 0.4 | 0.3 | 0.2 | 0.0 | 108 | 114 | 1.3 | 1.3 |
| Example 16 | 1.9 | 2.6 | 1.7 | 2.4 | 0.5 | 1.2 | 105 | 95 | 2.3 | 2.8 |
| Comparative Example 7 | 2.2 | 2.0 | 1.5 | 1.1 | 0.0 | 0.0 | 117 | 121 | 2.6 | 2.5 |

TABLE 1-2

|  | Difference in heat shrinkage stress (N/mm$^2$) | | Difference in dimensional change rate (%) | | Average reflectance (%) | | | |
| --- | --- | --- | --- | --- | --- | --- | --- | --- |
|  | 100° C. | 150° C. | 100° C. | 150° C. | 400 nm to 800 nm | 400 nm to 700 nm | 850 nm to 1,200 nm | 1,200 nm to 1,400 nm |
| Example 1 | 0.27 | 0.41 | 0.1 | 0.2 | 12 | 12 | 12 | 12 |
| Example 2 | 0.03 | 0.27 | 0.1 | 0.3 | 12 | 12 | 12 | 12 |
| Example 3 | 0.05 | 0.00 | 0.1 | 0.2 | 12 | 12 | 12 | 12 |
| Example 4 | 0.00 | 0.14 | 0.0 | 0.3 | 12 | 12 | 12 | 12 |
| Example 5 | 0.95 | 1.08 | 0.3 | 0.9 | 12 | 12 | 12 | 12 |
| Example 6 | 0.79 | 0.43 | 0.2 | 0.1 | 12 | 12 | 12 | 12 |
| Comparative Example 1 | 0.00 | 0.20 | 0.1 | 0.1 | 12 | 12 | 12 | 12 |
| Comparative Example 2 | 0.00 | 0.00 | 0.1 | 0.1 | 12 | 12 | 12 | 12 |
| Comparative Example 3 | 0.00 | 0.00 | 0.1 | 0.2 | 12 | 12 | 12 | 12 |
| Comparative Example 4 | 0.40 | 0.70 | 0.4 | 1.3 | 12 | 12 | 12 | 12 |
| Example 7 | 0.20 | 0.30 | 0.1 | 0.1 | 12 | 12 | 92 | 18 |
| Example 8 | 0.05 | 0.20 | 0.1 | 0.3 | 12 | 12 | 89 | 16 |
| Example 9 | 0.00 | 0.00 | 0.1 | 0.2 | 12 | 12 | 89 | 16 |
| Example 10 | 0.00 | 0.04 | 0.0 | 0.2 | 12 | 12 | 87 | 15 |
| Example 11 | 0.70 | 0.80 | 0.2 | 0.6 | 12 | 12 | 89 | 16 |
| Comparative Example 5 | 0.00 | 0.15 | 0.0 | 0.1 | 12 | 12 | 93 | 19 |
| Example 12 | 0.00 | 0.10 | 0.0 | 0.1 | 12 | 12 | 90 | 51 |
| Example 13 | 0.70 | 0.80 | 0.2 | 0.6 | 12 | 12 | 90 | 51 |
| Comparative Example 6 | 0.00 | 0.15 | 0.0 | 0.1 | 12 | 12 | 90 | 51 |
| Example 14 | 0.27 | 0.40 | 0.1 | 0.2 | 18 | 21 | 11 | 10 |
| Example 15 | 0.20 | 0.30 | 0.1 | 0.2 | 19 | 12 | 92 | 18 |
| Example 16 | 0.70 | 0.70 | 0.2 | 0.5 | 12 | 12 | 76 | 15 |
| Comparative Example 7 | 0.00 | 0.20 | 0.0 | 0.1 | 12 | 12 | 12 | 12 |

TABLE 1-3

|  | Evaluation of outer appearance (irregularities) | | | Evaluation of outer appearance (wrinkles) |
| --- | --- | --- | --- | --- |
|  | 20° | 50° | 70° | |
| Example 1 | A | C | C | A |
| Example 2 | A | B | C | A |
| Example 3 | A | A | B | A |
| Example 4 | A | A | A | A |
| Example 5 | A | A | A | A |
| Example 6 | A | A | A | C |
| Comparative Example 1 | C | C | C | A |
| Comparative Example 2 | C | C | C | A |
| Comparative Example 3 | C | C | C | A |
| Comparative Example 4 | C | C | C | C |
| Example 7 | A | C | C | A |
| Example 8 | A | B | C | A |
| Example 9 | A | A | B | A |
| Example 10 | A | A | A | A |
| Example 11 | A | A | A | A |

TABLE 1-3-continued

| | Evaluation of outer appearance (irregularities) | | | Evaluation of outer appearance (wrinkles) |
|---|---|---|---|---|
| | 20° | 50° | 70° | |
| Comparative Example 5 | C | C | C | A |
| Example 12 | A | A | B | A |
| Example 13 | A | A | A | A |
| Comparative Example 6 | C | C | C | A |
| Example 14 | B | C | C | A |
| Example 15 | B | C | C | A |
| Example 16 | A | A | A | A |
| Comparative Example 7 | C | C | C | A |

INDUSTRIAL APPLICABILITY

A multi-layer laminated film inhibits generation of irregular strains caused by hot-press molding in a molded article comprising the multi-layer laminated film, and an interlayer and a support that are arranged on at least one side of the multi-layer laminated film; and the molded article.

The invention claimed is:

1. A multi-layer laminated film comprising layers composed of a crystalline thermoplastic resin A (A layers) and layers composed of a non-crystalline thermoplastic resin B as a major component (B layers), which A layers and B layers are alternately laminated in 51 or more layers, wherein the multi-layer laminated film is biaxially stretched in the longitudinal and transverse directions at a temperature from 80° C. to 120° C. with a draw ratio of 2 to 6 for each direction, heat-treating the film at a temperature from 160° C. to 220° C., and subjecting the heat-treated film to cooling at a temperature that is 80° C. of higher; and wherein said film has:
a heat shrinkage stress of not less than 0.5 MPa and not more than 5 MPa at 150° C. in longitudinal and width directions of said film; and
a heat shrinkage stress kick-off temperature of 110° C. or lower in both the longitudinal and width directions of said film, said heat shrinkage stress kick-off temperature being defined as, in a heat shrinkage stress curve determined under a condition where temperature is 25° C. to 200° C. and a heating rate is 5° C./min, the temperature at an intersection between a baseline preceding an initial rise of said heat shrinkage stress curve and a tangent line drawn at a point where said heat shrinkage stress curve has a maximum slope after said initial rise.

2. The multi-layer laminated film according to claim 1, wherein said film has an average reflectance of 15% or less at a wavelength of 400 to 700 nm.

3. The multi-layer laminated film according to claim 1, wherein said film has a heat shrinkage stress of not less than 0.5 MPa and not more than 5 MPa at 130° C. in both the longitudinal and width directions.

4. The multi-layer laminated film according to claim 1, wherein said film has a heat shrinkage stress of not less than 0.5 MPa and not more than 5 MPa at 110° C. in at least one of the longitudinal and width directions.

5. The multi-layer laminated film according to claim 1, wherein a difference in the heat shrinkage stress at 100° C. between the longitudinal and width directions is 0.05 N/mm$^2$ or less.

6. The multi-layer laminated film according to claim 1, wherein a difference in a dimensional change rate at 100° C. between the longitudinal direction of said film and the direction perpendicular thereto is 0.5% or less.

7. The multi-layer laminated film according to claim 1, wherein
said thermoplastic resin A is composed of a polyethylene terephthalate resin; and
said thermoplastic resin B is composed of a copolymerized polyethylene terephthalate resin in which a spiroglycol component(s) and a cyclohexane dicarboxylic acid component(s) are copolymerized.

8. The multi-layer laminated film according to claim 1, wherein said film has an average reflectance of 15% or less in a wavelength range of 400 nm to 700 nm and 70% or higher in a wavelength range of 850 nm to 1,200 nm.

9. The multi-layer laminated film according to claim 1, wherein said film has an average reflectance of 40% or higher in a wavelength range of 1,200 nm to 1,400 nm.

10. The multi-layer laminated film according to claim 1, wherein said film has a heat shrinkage rate of 6% or less at 150° C. in the longitudinal and width directions.

11. A molded article comprising said multi-layer laminated film according to claim 1 and a support laminated via an interlayer on at least one side of said multi-layer laminated film.

12. A heat-shielding article comprising:
the multi-layer laminated film according to claim 1;
interlayers each of which is arranged on each side of said multi-layer laminated film; and
transparent substrates each of which is arranged on a surface opposite said multi-layer laminated film on each of said two interlayers.

13. A heat-shielding article comprising:
a multi-layer laminated film;
interlayers each of which is arranged on each side of said multi-layer laminated film; and
transparent substrates each of which is arranged on a surface opposite to said multi-layer laminated film on each of said two interlayers,
wherein said multi-layer laminated film comprises layers composed of a crystalline thermoplastic resin A (A layers) and layers composed of a non-crystalline thermoplastic resin B as a major component (B layers), which A layers and B layers are alternately laminated in 51 or more layers wherein the multi-layer laminated film is biaxially stretched in the longitudinal and transverse directions at a temperature from 80° C. to 120° C. with a draw ratio of 2 to 6 for each direction, heat-treating the film at a temperature from 160° C. to 220° C., and subjecting the heat-treated film to cooling at a temperature that is 80° C. of higher;
said laminated film has an average reflectance of 15% or less at a wavelength of 400 to 700 nm and 60% or higher at a wavelength of 900 to 1,200 nm; and
the difference in the heat shrinkage stress at 100° C. between the longitudinal direction of said film and the direction perpendicular thereto is 0.05 N/mm$^2$ or less.

\* \* \* \* \*